(12) United States Patent
Pazhyannur et al.

(10) Patent No.: US 11,490,263 B2
(45) Date of Patent: Nov. 1, 2022

(54) ASSISTED DISCOVERY OF A LOCAL PRIVATE 3GPP NETWORK VIA A LOCAL PRIVATE NON-3GPP WIRELESS NETWORK

(71) Applicant: Cisco Technology, Inc., San Jose, CA (US)

(72) Inventors: Rajesh S. Pazhyannur, Fremont, CA (US); Shailender Potharaju, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 414 days.

(21) Appl. No.: 16/590,713

(22) Filed: Oct. 2, 2019

(65) Prior Publication Data
US 2021/0105632 A1    Apr. 8, 2021

(51) Int. Cl.
*H04W 72/04*   (2009.01)
*H04W 16/14*   (2009.01)
*H04W 8/12*    (2009.01)
*H04W 60/00*   (2009.01)
*H04W 8/24*    (2009.01)
(Continued)

(52) U.S. Cl.
CPC ............ *H04W 16/14* (2013.01); *H04W 8/12* (2013.01); *H04W 8/24* (2013.01); *H04W 60/00* (2013.01); *H04W 68/005* (2013.01); *H04W 76/11* (2018.02); *H04W 84/045* (2013.01)

(58) Field of Classification Search
None
See application file for complete search history.

(56) References Cited

U.S. PATENT DOCUMENTS 8,036,192 B2   10/2011   Yaqub et al.
9,084,081 B2    7/2015   Gupta et al.
(Continued)

OTHER PUBLICATIONS

Unknown, "Developer Guide | Geolocation API | Google Developers", 11 pages, retrieved from https://developers.google.com/maps/documentation/geolocation/intro, on Oct. 2, 2019.
(Continued)

*Primary Examiner* — Willie J Daniel, Jr.
(74) *Attorney, Agent, or Firm* — Edell, Shapiro & Finnan, LLC

(57) ABSTRACT

In one example, a user equipment (UE) has a non-Third Generation Partnership Project (non-3GPP) radio transceiver for communication in a local private non-3GPP wireless network and a 3GPP radio transceiver for communication in a 3GPP network, where the 3GPP network may be a public 3GPP network or a local private 3GPP network operative in a shared spectrum according to a system for shared spectrum access. Initially, the UE may operate the 3GPP radio transceiver for communication in the public 3GPP network, without performing regular scanning for the local private 3GPP network. In a scan operation using the non-3GPP radio transceiver, the UE may receive from a non-3GPP access point of the local private non-3GPP wireless network one or more messages including one or more information elements. If an information element indicates presence of the local private 3GPP network, the UE may identify and register with the local private 3GPP network.

20 Claims, 15 Drawing Sheets

(51) Int. Cl.
*H04W 76/11* (2018.01)
*H04W 68/00* (2009.01)
*H04W 84/04* (2009.01)

(56) References Cited

U.S. PATENT DOCUMENTS

| | | | |
|---|---|---|---|
| 9,237,435 | B2 | 1/2016 | Ahmadi et al. |
| 9,763,074 | B2 | 9/2017 | Park et al. |
| 10,306,543 | B2 | 5/2019 | Ahmadi et al. |
| 2004/0199616 | A1 | 10/2004 | Karhu |
| 2011/0019582 | A1 | 1/2011 | Okmyanskiy et al. |
| 2016/0044711 | A1 | 2/2016 | Lou et al. |
| 2016/0234757 | A1 | 8/2016 | Somasundaram et al. |
| 2016/0323925 | A1 | 11/2016 | Alanen et al. |
| 2016/0373935 | A1* | 12/2016 | Smith ............ H04M 15/60 |
| 2019/0288894 | A1 | 9/2019 | Boudreau et al. |

OTHER PUBLICATIONS

5G Workgroup, "The Role of Wi-Fi and Unlicensed Technologies", Wireless Broadband Alliance, Version 1.0, Sep. 6, 2017, 57 pages.
Monica Paolini, "CBRS: Should the enterprise and venue owners care?", Senza Fili, 2019, 52 pages.
Banerji, Sourangsu et al., "On IEEE 802.11: Wireless LAN Technology", International Journal of Mobile Network Communications & Telematics (IJMNCT) vol. 3, Issue. 4, 2013. [DOI: 10.5121/ijmnct 2013.3405], 19 pages.
Unknown, "Real-time Traffic over WLAN Roaming", Real-Time Traffic over Wireless LAN Solution Reference Network Design Guide, IEEE standards for 802.11r and 802.11k, 20 pages.
Mazlan, Muhammad Al Amin Amali et al., "WiFi Fingerprinting Indoor Positioning with Multiple Access Points in a Single Base Station using Probabilistic Method", International Journal of Applied Engineering Research, ISSN 0973-4562, vol. 12, No. 6, Jan. 2017, 13 pages.
Xia, Shixiong et al., "Indoor Fingerprint Positioning Based on Wi-Fi: An Overview", ISPRS International Journal of Geo-Information, Apr. 28, 2017, 6, 135, 25 pages.
3GPP, "LTE; Telecommunication management; Home enhanced Node B (HeNB) Operations, Administration, Maintenance and Provisioning (OAM&P); Procedure flows for Type 1 interface HeNB to HeNB Management System (HeMS)", ETSI TS 132 593 V9.0.0, 3GPP TS 32.593 version 9.0.0 Release 9, Feb. 2010, 21 pages.
Unknown, "WiFi Alliance Agile Multiband (MBO)", 6 pages retrieved from https://www.cisco.com/c/en/us/td/docs/wireless/controller/9800/16-12/config-guide/b_wl_16_12_cg/b_wl_16_12_cg_chapter_01111001.html, on Oct. 2, 2019.
Corici, Marius et al., "Access Network Discovery and Selection in the Future Broadband Wireless Environment" Competence Center NGNI, Fraunhofer FOKUS, 27 pages.
Mrindoko, Nicholaus R. et al., "An Enhanced Wi-Fi Indoor Positioning Fingerprinting Algorithm Based on Query Filter", International Journal of Advanced Research in Computer Science and Software Engineering, vol. 7, Issue 2, Feb. 2017, ISSN: 2277 128X, 4 pages.
Kwak, Hyoungwon et al., "Mobility Management Survey for Home-eNB Based 3GPP LTE Systems", Journal of Information Processing Systems, vol. 4, No. 4, Dec. 2008, KIPS (ISSN 1976-913X), DOI: 10.3745/JIPS.2008.4.4.145, 8 pages.
Cisco White Paper, "Fastlane+ White Paper", Jan. 27, 2021, 12 pages.
Giant Nerd Wifi Blog, "Cisco WLC Fastlane for iOS—What it Does", Jul. 6, 2017, 4 pages.

* cited by examiner

_US 11,490,263 B2_

ASSISTED DISCOVERY OF A LOCAL PRIVATE 3GPP NETWORK VIA A LOCAL PRIVATE NON-3GPP WIRELESS NETWORK

TECHNICAL FIELD

The present disclosure relates generally to telecommunications systems, and more particularly to an assisted discovery of a local private Third Generation Partnership Project (3GPP) network via a local private non-3GPP wireless network for a user equipment (UE).

BACKGROUND

A user equipment (UE) may include a Third Generation Partnership Project (3GPP) radio transceiver for communication in a public 3GPP (cellular) network and a non-Third Generation Partnership Project (non-3GPP) radio transceiver for communication in a local private non-3GPP wireless network. The public 3GPP network may be, for example, a Fourth Generation (4G)/Long Term Evolution (LTE) based network, and the non-3GPP wireless network may be an Institute of Electrical and Electronics Engineers (IEEE) 802.11 compliant wireless local area network (WLAN).

Typically, an enterprise utilizes a local private WLAN to provide wireless communication for UEs on enterprise premises. Looking ahead, an enterprise may additionally utilize a local private 3GPP network operative in a shared spectrum, such as a Citizens Broadcast Radio Services (CBRS) band. Spectrum sharing in a CBRS network is facilitated by a spectrum access system (SAS) which is configured to authorize and manage the use of spectrum of CBRS base stations across different CBRS networks.

Unfortunately, a UE operating its 3GPP radio transceiver for communication in a public 3GPP network may have to regularly perform out-of-band scanning using the 3GPP radio transceiver for discovery of a local private 3GPP network for communication.

DESCRIPTION OF EXAMPLE EMBODIMENTS

Figure 1:
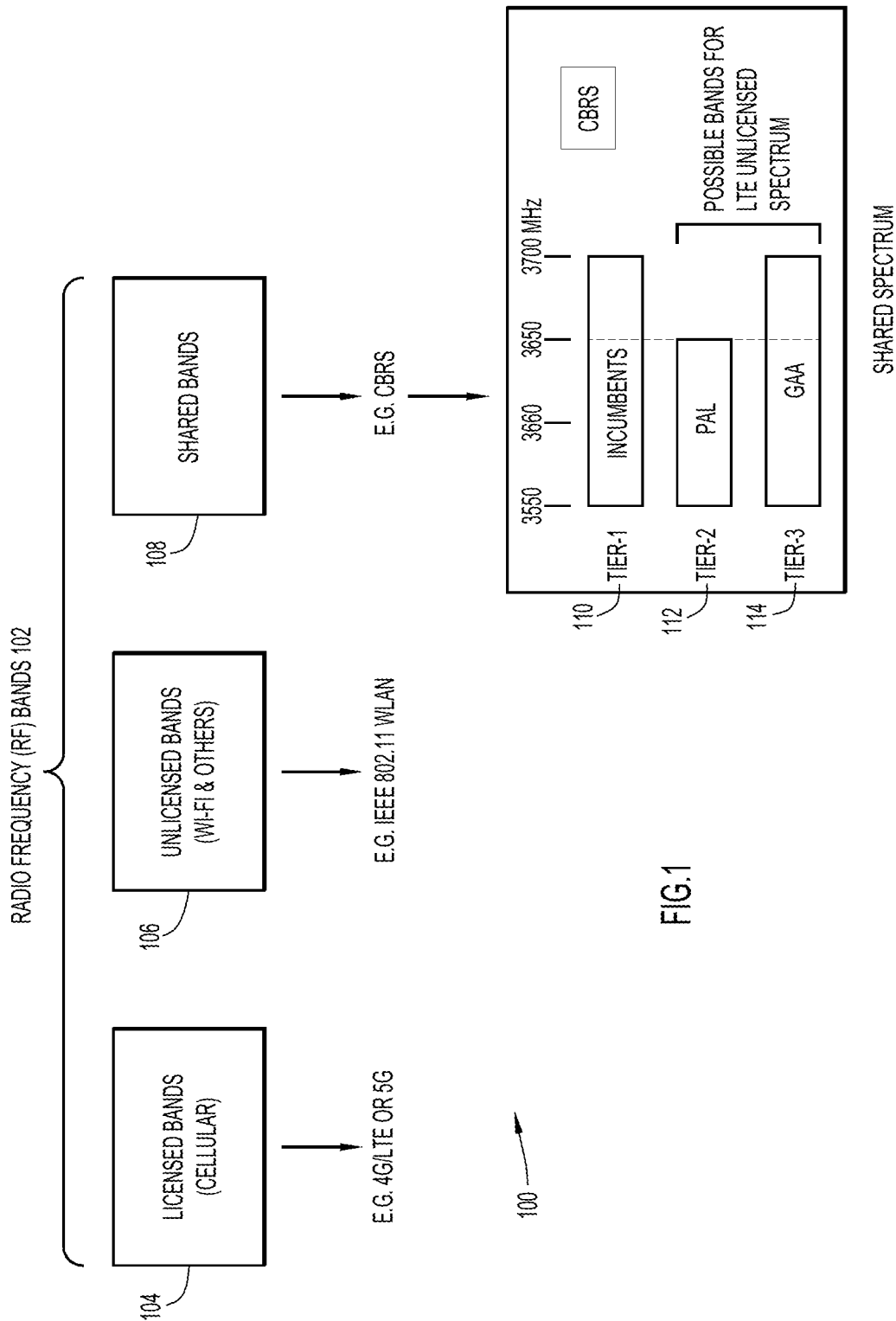
FIG. 1 is a reference diagram for describing radio frequency (RF) bands used for radio communications for mobile devices or user equipment (UE)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for use in assisted discovery of local private Third Generation Partnership Project (3GPP) networks via local private non-3GPP wireless networks for user equipment (UE) are described herein. The techniques and mechanisms of the present disclosure may be suitable for use in enterprise environments.

In one illustrative example, a communication system for use in an enterprise may include a local private non-3GPP wireless network and a local private 3GPP network operative in a shared spectrum according to a system for shared spectrum access. A non-3GPP access point of the local private non-3GPP wireless network may operate to transmit one or more information elements indicating presence of the local private 3GPP network operative in the shared spectrum according to the system for shared spectrum access. In response, a 3GPP base station of the local private 3GPP network may receive a registration message for registration of a UE that received the one or more messages including the one or more information elements indicating the presence of the local private 3GPP network.

In another illustrative example, a UE may have a non-3GPP radio transceiver operative for communication in a non-3GPP wireless network and a 3GPP radio transceiver operative for communication in a 3GPP network, wherein the 3GPP network may be a public 3GPP (cellular) network or a local private 3GPP network operative in a shared spectrum according to a system for shared spectrum access. Initially, the UE may operate the 3GPP radio transceiver for communication in the public 3GPP network. In a scan operation using the non-3GPP radio transceiver, the UE may receive, from a non-3GPP access point of the local private non-3GPP wireless network, one or more messages including one or more information elements. Based on identifying that one or more of the information elements indicate presence of the local private 3GPP network, the UE may transmit from the 3GPP radio transceiver a registration message to a 3GPP base station of the local private 3GPP network for registration in the local private 3GPP network.

More detailed and alternative techniques and implementations are provided herein as described below.

EXAMPLE EMBODIMENTS

As described in the Background section, a user equipment (UE) may include a Third Generation Partnership Project (3GPP) radio transceiver for communication in a public 3GPP network and a non-3GPP (non-3GPP) radio transceiver for communication in a local private non-3GPP wireless network. The public 3GPP network may be, for example, a Fourth Generation (4G)/Long Term Evolution (LTE) based network, and the non-3GPP wireless network may be an Institute of Electrical and Electronics Engineers (IEEE) 802.11 compliant wireless local area network (WLAN). Communication in the public 3GPP network may occur in a licensed band, whereas communication in the local private non-3GPP wireless network may occur in an unlicensed band.

Typically, an enterprise utilizes a local private WLAN to provide wireless communication for UEs on enterprise premises. Looking ahead, an enterprise may additionally utilize a local private 3GPP network operative in shared spectrum of a Citizens Broadcast Radio Services (CBRS) band. Spectrum sharing in a CBRS-based network is facilitated by a spectrum access system (SAS) which is configured to authorize and manage the use of spectrum of CBRS base stations in different CBRS networks.

Unfortunately, a UE operating its 3GPP radio transceiver for communication in a public 3GPP network may have to regularly perform out-of-band scanning using the 3GPP radio transceiver for discovery of a local private 3GPP network for communication, in an environment where frequency channels are dynamically allocated and changing.

FIG. 1 is a reference diagram 100 for describing radio frequency (RF) bands 102 used for radio communications for UEs. RF bands 102 may include licensed bands 104 for 3GPP or cellular networks (e.g. 4G/LTE or Fifth Generation "5G" networks), unlicensed bands 106 for non-3GPP or Wi-Fi networks (e.g. IEEE 802.11 WLANs), and shared bands 108 (e.g. for CBRS).

CBRS provides for use of a 150 MHz-wide broadcast band in the 3550-3700 MHz frequency range, i.e. Time Division (TD) Long-Term Evolution (LTE) (TD-LTE) band "48." There are three types of users allowed to access this spectrum, including incumbent users, Priority Access License (PAL) users, and General Authorized Access (GAA) users. The SAS serves to protect incumbents from interference from lower-tier PAL and GAA users, and protects PAL users from interference from other PAL and GAA users. The SAS maintains database information of spectrum usage by incumbent, PAL, and GAA users in all census tracts (or areas) and allocates channels to base stations (also referred to as Citizens Broadband Radio Service Devices or "CBSDs") according to a variety of rules.

For example, a Tier-1 type 110 or incumbent users (such as navy ships, military radars and fixed satellite service earth stations) are allocated access to all the channels. A Tier-2 type 112 or PAL users are granted access in the 3550-3650 MHz band and are allowed to use a maximum of seven (7) 10 MHz channels in a census tract (or area). Here, no licensee is allowed to take more than four (4) PAL channels in a census tract. A Tier-3 type 114 or GAA users are allowed access to all the channels, but only channels that are not being used by the other above-indicated users. A SAS makes determinations based on multiple factors and informs CBSDs of allowable operating parameters (e.g. frequency band or channel and maximum Effective Isotropic Radiated Power or "EIRP") that it can use at a given point of time, to ensure compliance with regulations with the Federal Communications Commission (FCC) and other regulatory bodies.

FIGS. 2A-2D are illustrative representations 200A-200D of different scenarios for communications involving a UE 202 operating in a public 3GPP cellular network 210 and/or in a communication system 240 of an enterprise according to some implementations of the present disclosure. The communication system 240 of the enterprise may include a local private non-3GPP wireless network 220 and a local private 3GPP network 230 operative in a shared spectrum according to a system for shared spectrum access 270. The public 3GPP cellular network 210 may include a core network and one or more base stations 212 such as a base station 214 (e.g. an eNB). The local private non-3GPP wireless network 220 may include a non-3GPP core network and one or more access points, such as an access point (AP) 222, connected to the non-3GPP core network. The local private 3GPP network 230 may include a 3GPP core network and one or more base stations, such as a base station 232, connected to the 3GPP core network.

In some implementations, the communication system 240 may be an enterprise system of an enterprise, where the local private non-3GPP wireless network 220 is an enterprise local private non-3GPP wireless network of the enterprise and the local private 3GPP network 230 is an enterprise local private 3GPP network of the enterprise. In some implementations, the local private non-3GPP wireless network 220 may be a local private IEEE 802.11 compliant WLAN including one or more IEEE 802.11 compliant APs. The local private 3GPP network 230 may be a local private LTE network or a local private 5G network. The shared spectrum may be CBRS shared spectrum, where system for shared spectrum access 270 is a SAS, and where a given CBRS base station (e.g. base station 232) in the local private 3GPP network may be referred to as a CBSD.

Figure 2A:
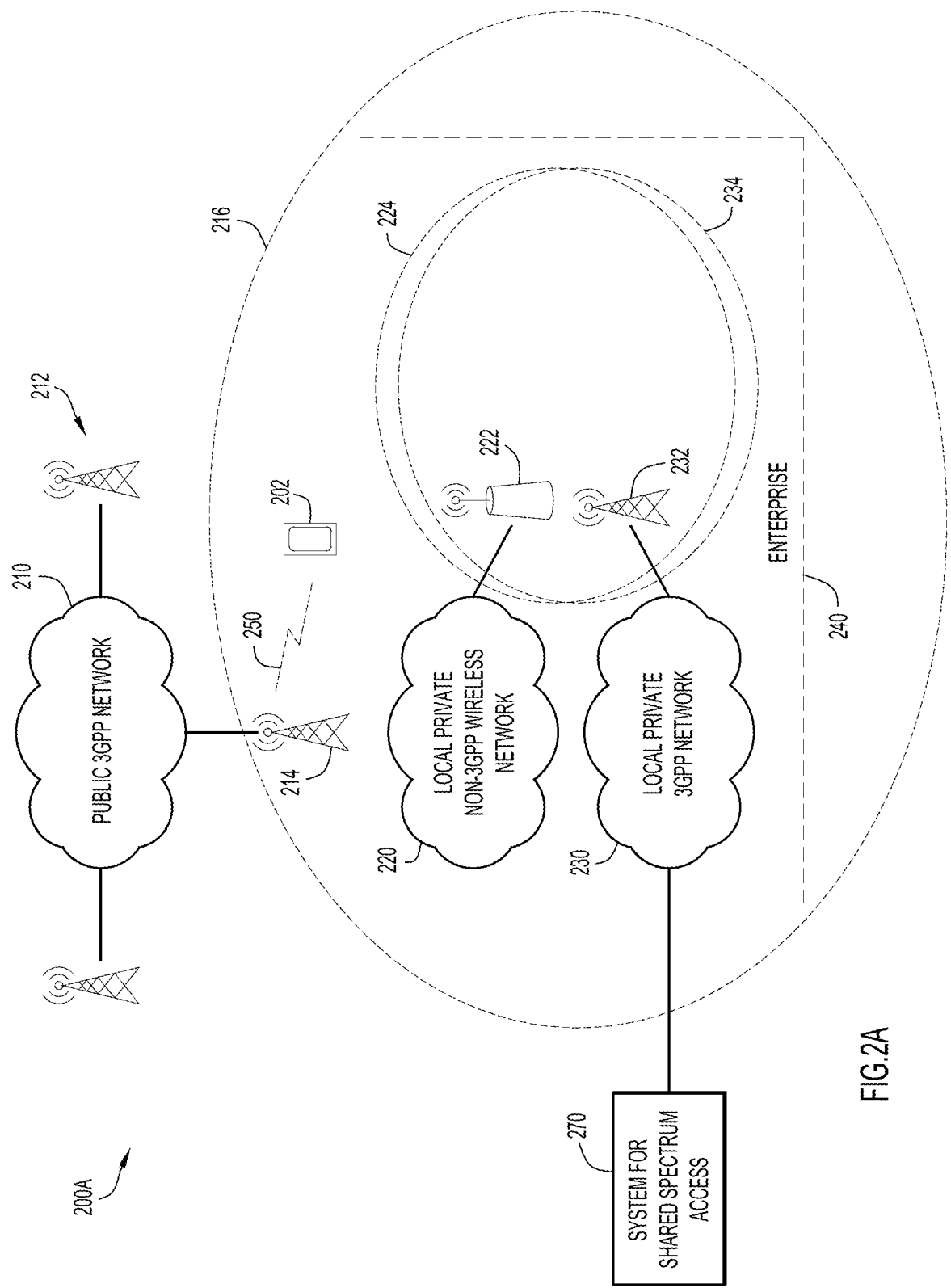
FIGS. 2A-2D are illustrative representations of different scenarios for communication involving a UE in a public Third Generation Partnership Project (3GPP) network and in a communication system of an enterprise according to the present disclosure, where the communication system includes a local private non-3GPP wireless network and a local private 3GPP network operative in a shared spectrum according to a system for shared spectrum access.
Figure 2B:
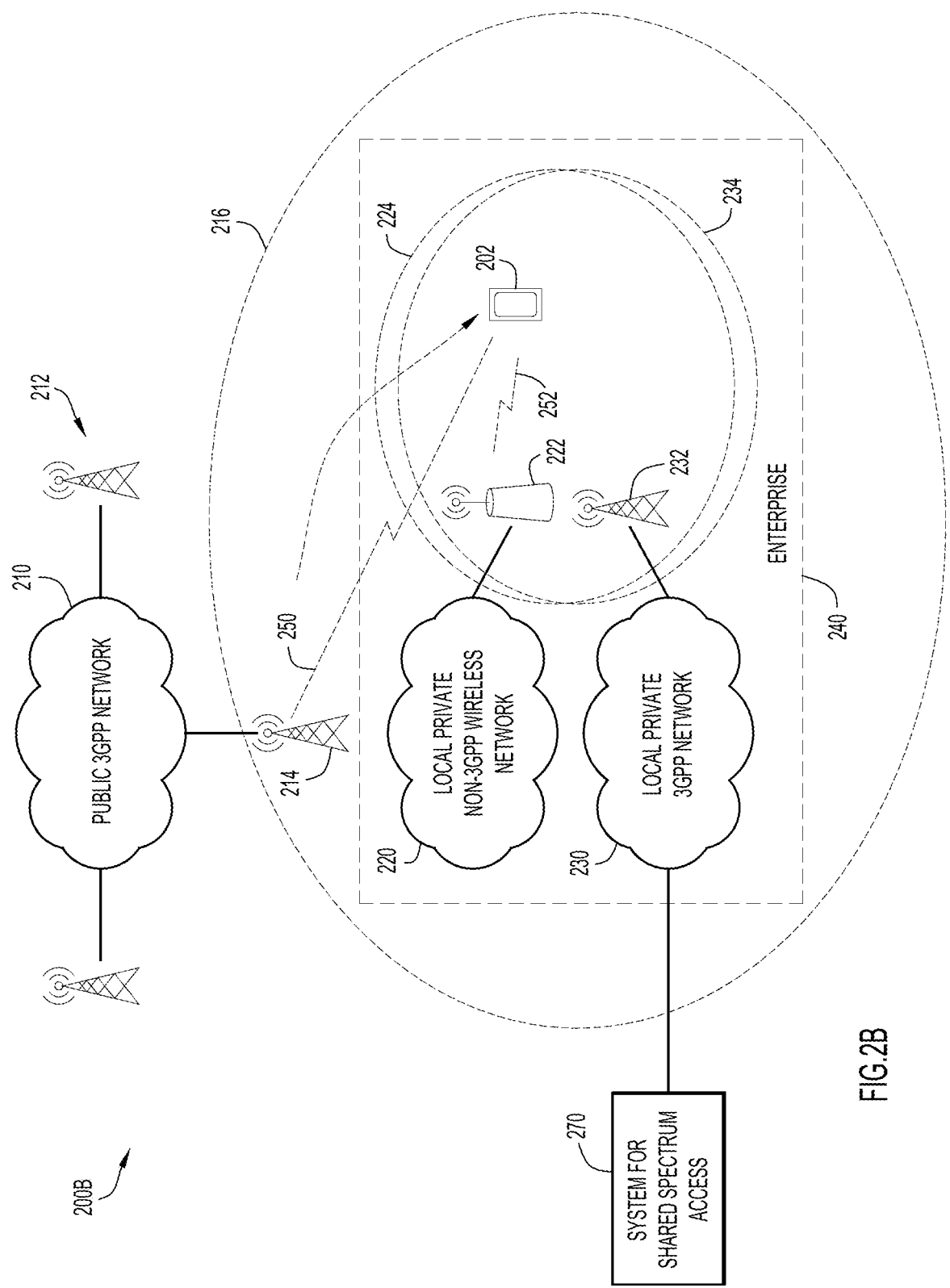
Figure 2C:
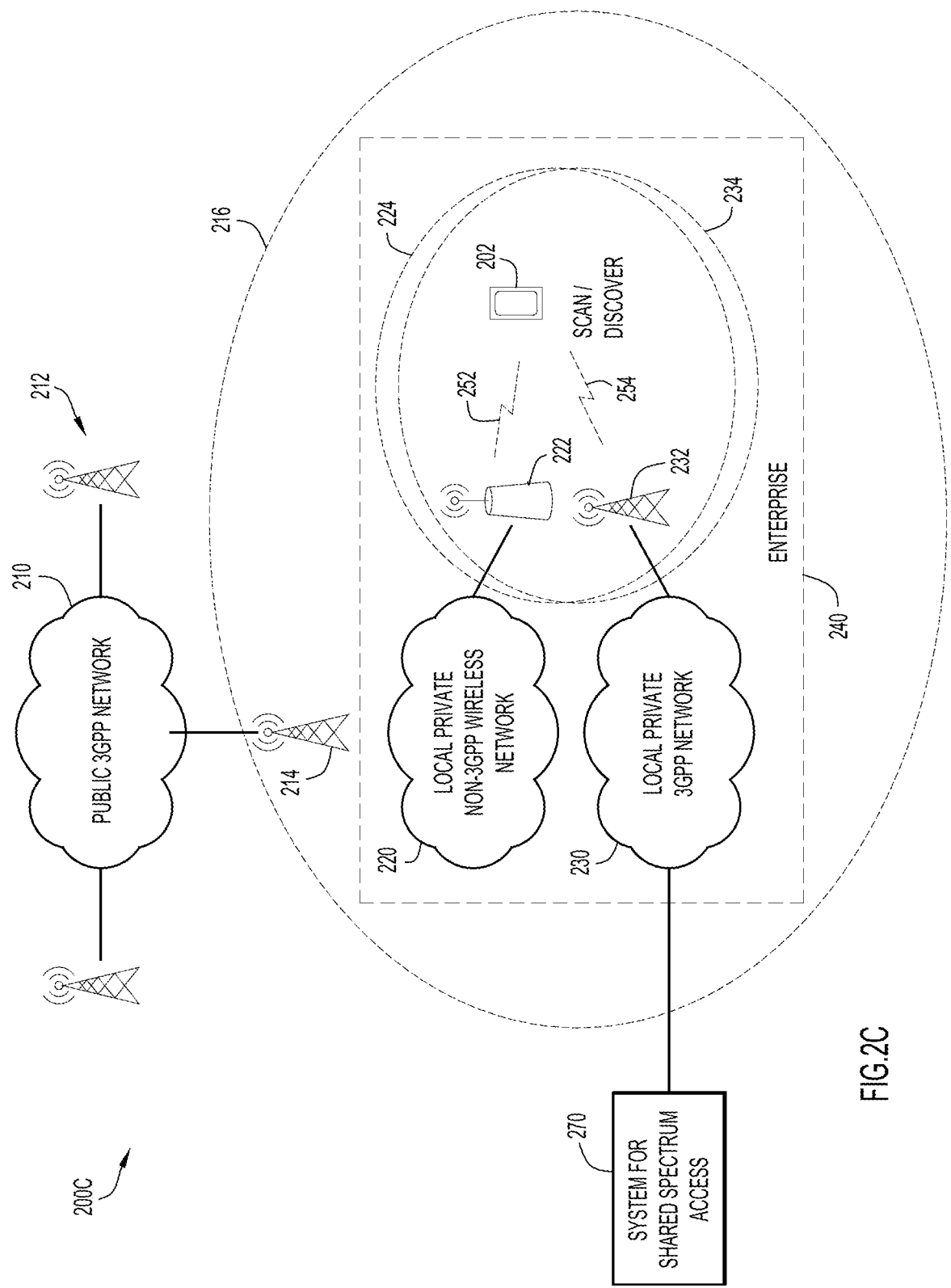
Figure 2D:
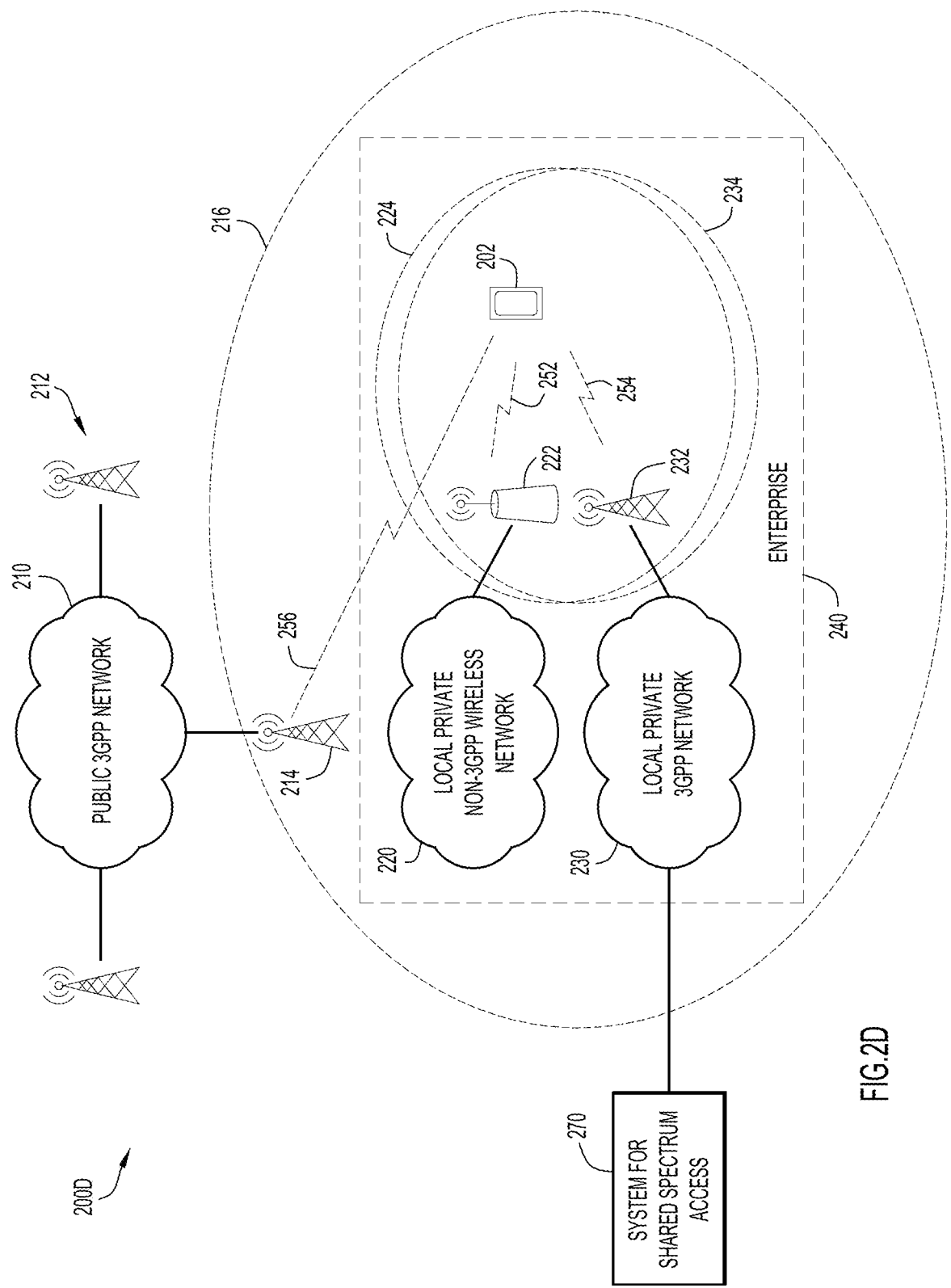

In the scenario depicted in FIG. 2A, UE 202 is shown to be located within a coverage area 216 of base station 214 of public 3GPP network 210 and operate for a communication 250 in the public 3GPP network 210. However, UE 202 is not located within a coverage area 224 of the local private non-3GPP wireless network 220 for communication, nor is it located within a (substantially overlapping) coverage area 234 of local private 3GPP network 230 for communication. As shown in FIG. 2A, coverage area 224 of the local private non-3GPP wireless network 220 may overlap with coverage area 234 of the local private 3GPP network 230, either in part or in substantial part. FIGS. 2B-2D will be referenced later in connection with the flowcharts of FIGS. 3, 4, and 5A-5D.

Figure 3A:
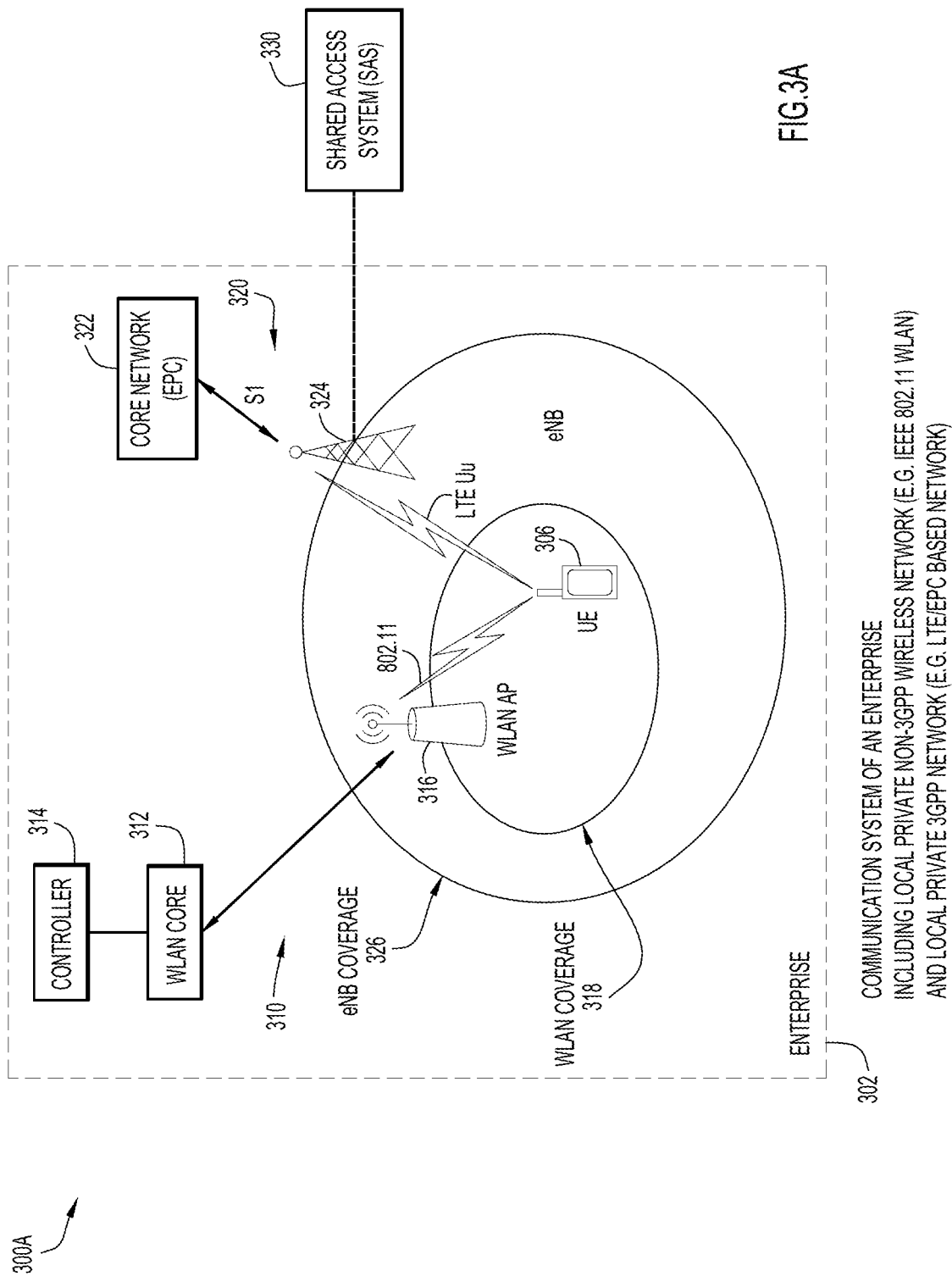
FIG. 3A is an illustrative representation of a communication system of an enterprise, where the communication system includes the local private non-3GPP wireless network and the local private 3GPP network are provided in the communication system as separate networks according to at least some implementations.

In some implementations, the networks of communication system 240 may be provided as separate networks. Referring ahead to FIG. 3A, an illustrative representation 300A of a communication system 302 of an enterprise is shown. In FIG. 3A, the communication system 302 is made of separate networks which include a local private WLAN 310 and a local private CBRS LTE network 320 according to some implementations. The local private WLAN 310 and the local private CBRS LTE network 320 may be completely separated, isolated networks; alternatively, the networks may be only partially isolated networks. Local private WLAN 310 may include a WLAN network core 312 which includes a controller 314 (e.g. a wireless LAN controller or "WLC") and one or more APs such as an AP 316 which provides a coverage area 318 for a UE 306. On the other hand, local private CBRS LTE network 320 may include a core network 322 (e.g. an Evolved Packet Core or "EPC," in full or part) and one or more base stations, such as a base station 324 (e.g. a CBRS base station or CBSD) which provides a coverage area 326 for UE 306. Local private CBRS LTE network 320 may operate in shared spectrum according to a SAS 330. Coverage area 318 of the local private non-3GPP wireless network 310 may overlap with coverage area 326 of the local private 3GPP network 320, either in part or in substantial part.

Figure 3B:
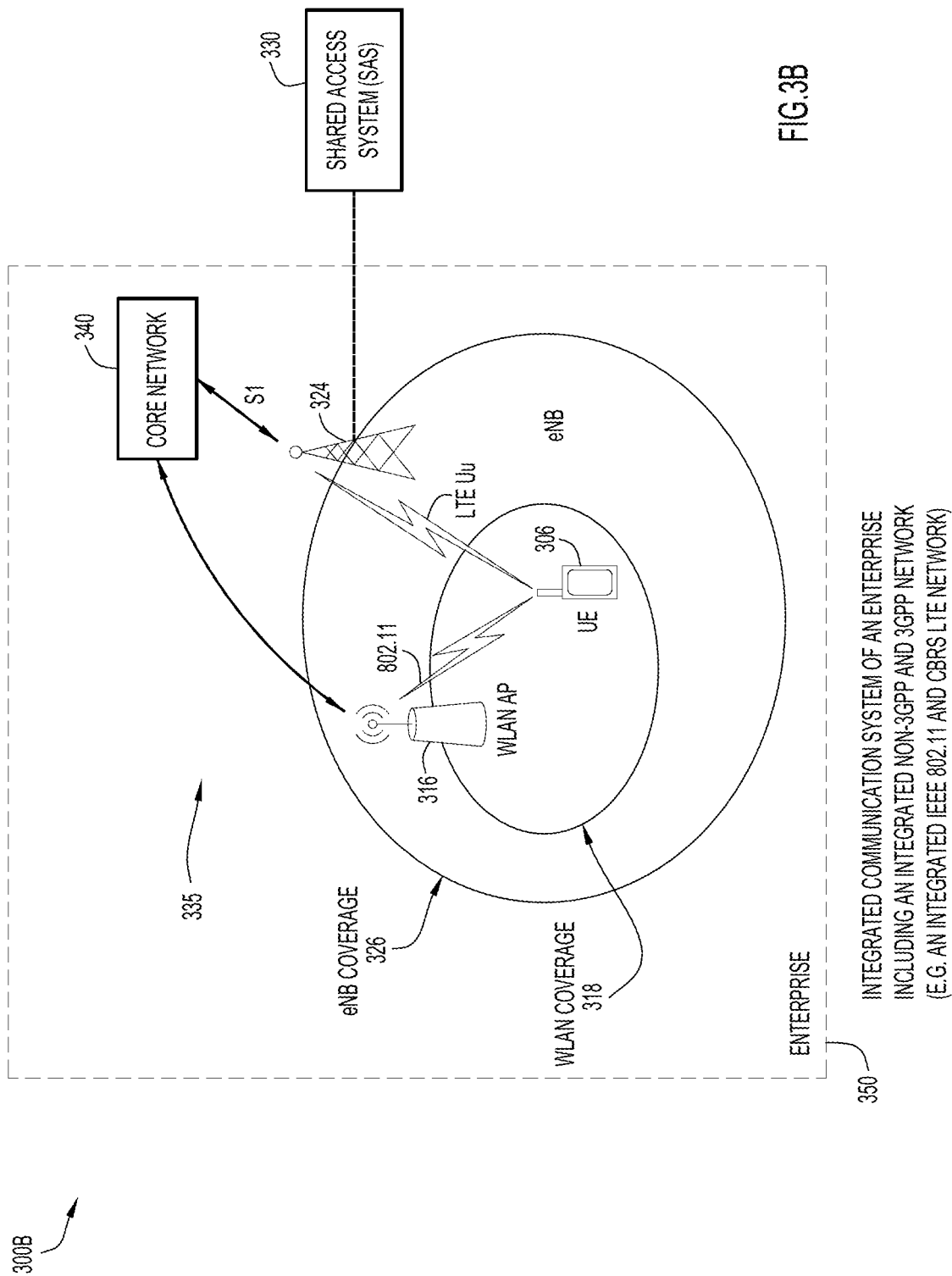
FIG. 3B is a basic illustrative representation of an integrated communication system of an enterprise, where the integrated communication system has an integrated local private non-3GPP and 3GPP network according to at least some implementations.

In other implementations, the networks may be part of an integrated communication system having an integrated local private non-3GPP and 3GPP network (e.g. having at least some or many common or shared functions or nodes). In FIG. 3B, an illustrative representation 300B of an integrated communication system 350 of an enterprise is shown, where the integrated communication system 350 has an integrated local private non-3GPP and 3GPP network 335 according to some implementations. Integrated communication system 350 having the integrated local private non-3GPP and 3GPP network 335 may include a core network 340, the one or more APs (such as AP 316) being connected to the core network 340, and the one or more base stations (such as base station 324) being connected to the core network 340.

Figure 4:
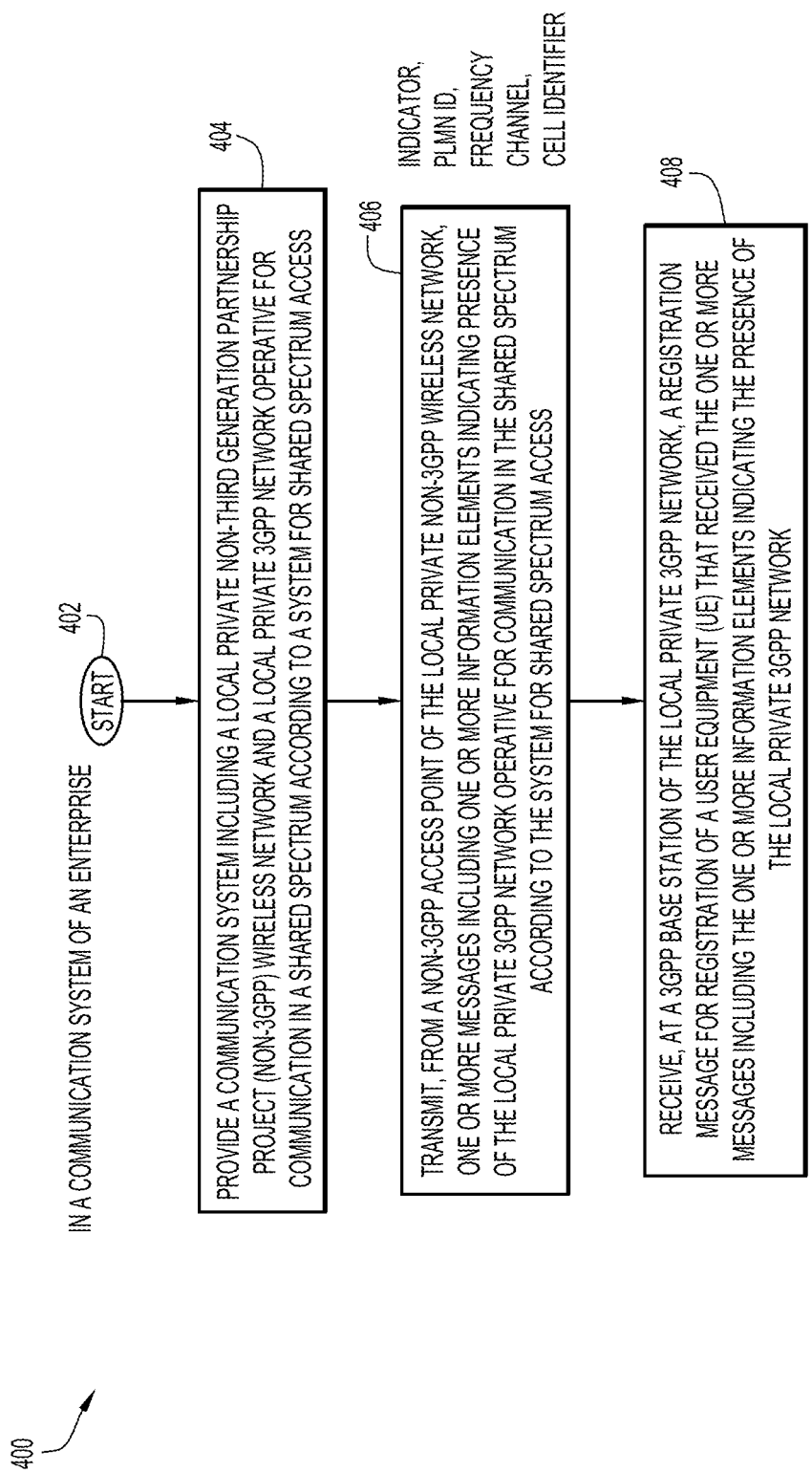
FIG. 4 is a flowchart for describing a method of operating a communication system which includes a local private non-3GPP wireless network and a local private 3GPP network operative in a shared spectrum according to a system for shared spectrum access, according to some implementations of the present disclosure.

FIG. 4 is a flowchart 400 for describing a method of operating a communication system which includes a local private non-3GPP wireless network and a local private 3GPP network operative in a shared spectrum according to a system for shared spectrum access. The method may be for use in more expediently establishing communication between a UE and the local private 3GPP network, and/or reducing power consumption of the UE. The UE may include a 3GPP radio transceiver and a non-3GPP radio transceiver, and operate the 3GPP radio transceiver according to Dual SIM (Subscriber Identity Module) Dual Standby (DSDS) (e.g. having a dual attach capability). The method may be embodied as a computer program product which includes one or more computer readable mediums having computer instructions stored therein which are executed by one or more network nodes, such as a controller, a network function, an access point, a base station, etc.

Beginning at a start block 402 of FIG. 4, a communication system is provided, where the communication system includes a local private non-3GPP wireless network and a local private 3GPP network operative for communication in a shared spectrum according to a system for shared spectrum access (step 404 of FIG. 4). In some implementations, the local private non-3GPP wireless network may be a local private IEEE 802.11 compliant WLAN which includes the non-3GPP access point which is an IEEE 802.11 compliant access point. The local private 3GPP network may be a local private LTE network or a local private 5G network. The local private 3GPP network may be operative for communication in CBRS spectrum, managed according to a SAS. In some implementations, the communication system may be an enterprise system for an enterprise, where the local private non-3GPP wireless network is an enterprise local private non-3GPP wireless network of the enterprise and the local private 3GPP network is an enterprise local private 3GPP network of the enterprise. See e.g. FIG. 2A.

One or more messages including one or more information elements may be transmitted from a non-3GPP access point of the local private non-3GPP wireless network (step 406 of FIG. 4). One or more of the information elements may indicate presence of the local private 3GPP network operative for communication in the shared spectrum according to the system for shared spectrum access. The one or more messages may be intended for receipt by one or more UEs in a coverage area of the local private non-3GPP wireless network. See e.g. FIG. 2B, where UE 202 further operates in coverage area 224 of the local private non-3GPP wireless network 220 and coverage area 234 of the local private 3GPP network 230, and receives a communication 252 via AP 222 of the local private non-3GPP wireless network 220.

Based on receipt and processing of the one or more information elements indicating presence of the local private 3GPP network, a UE may be triggered to scan, discover, or otherwise identify the local private 3GPP network for establishing communication therewith. Accordingly, a registration message for registration of a UE may be received at a 3GPP base station of the local private 3GPP network from a UE that receives the one or more information elements indicating the presence of the local private 3GPP network (step 408 of FIG. 4). See e.g. FIG. 2C, where UE 202 operates to scan, discover, or otherwise identify and register with local private 3GPP network 230 via base station 232 in a communication 254.

In some implementations, one or more information elements which indicate presence of the local private 3GPP network may include one or more of an indicator indicating the presence of the local private 3GPP network, a public land mobile network (PLMN) ID which identifies the local private 3GPP network, a frequency channel for use in the local private 3GPP network, or a cell identifier associated with the local private 3GPP network. In CBRS/LTE, the frequency channel may be an E-UTRA ("Evolved Universal Terrestrial Radio Access") Absolute Radio Frequency Channel Number or "EARFCN," where E-UTRA refers to Evolved Universal Mobile Telecommunications System or "UMTS" Terrestrial Radio Access. In LTE, the carrier frequency in the uplink and downlink is designated by the EARFCN, which ranges between 0-65535. In CBRS/LTE, the cell identifier may be a Physical Cell ID (PCI) which is an identifier of a network cell in the physical layer.

In some implementations, the one or more information elements indicating presence of the local private 3GPP network may be (regularly) broadcasted in a beacon message or beacon frame (i.e. for a passive scan operation of a UE). In some preferred implementations, the non-3GPP access point of the local private non-3GPP wireless network may broadcast a beacon message or beacon frame which includes an Organization Identifier (OI) or a Roaming Consortium OI (RCOI) indicating the presence of the local private 3GPP network.

In some implementations, the one or more information elements indicating presence of the local private 3GPP network may be transmitted (e.g. only) in response to receiving, from the UE at the non-3GPP access point, a message including a UE indicator indicating UE capability to operate in the local private 3GPP network. In some of these implementations using the UE indicator, the non-3GPP access point of the local private non-3GPP wireless network may participate in an active scan operation for a UE, transmitting a probe response message which includes the one or more information elements indicating the presence of the local private 3GPP network in response to receiving a probe request message from the UE.

Figure 5A:
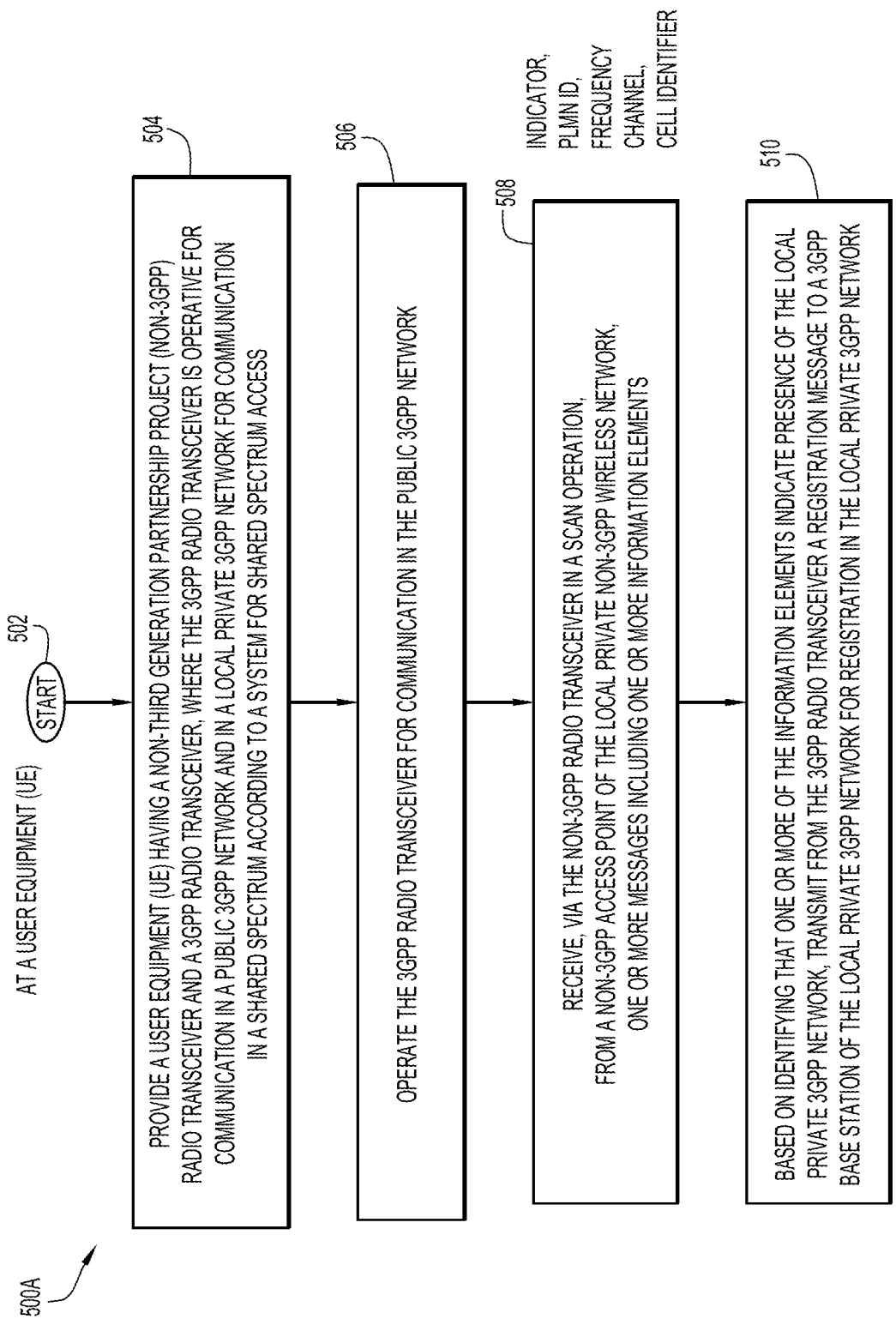
FIG. 5A is a flowchart for describing a method of operating a UE having a non-3GPP radio transceiver and a 3GPP radio transceiver, which may be for use in more expediently establishing communication between the UE and a local private 3GPP network and/or reducing power consumption of the UE, according to some implementations of the present disclosure.

FIG. 5A is a flowchart 500A for describing a method of operating a UE having a non-3GPP radio transceiver and a 3GPP radio transceiver. The non-3GPP radio transceiver may be operative for communication in a local private non-3GPP wireless network. The 3GPP radio transceiver may be operative for communication in a 3GPP network, which may be a public 3GPP network or a local private 3GPP network for communication in a shared spectrum according to a system for shared spectrum access. The UE may operate the 3GPP radio transceiver according to DSDS (e.g. having a dual attach capability). The method may be for use in more expediently establishing communication between a UE and a local private 3GPP network, and/or reducing power consumption of the UE. The method may be performed by a UE or one or more processors of the UE which control operation of the non-3GPP radio transceiver and the 3GPP radio transceiver. The method may be embodied as a computer program product which includes a computer readable medium having computer instructions stored therein which are executed by the one or more processors of the UE.

Beginning at a start block 502 of FIG. 5A, a UE is provided with a non-3GPP radio transceiver and a 3GPP radio transceiver (step 504 of FIG. 5A). The non-3GPP radio transceiver may be operative for communication in a local private non-3GPP wireless network. The 3GPP radio transceiver may be operative for communication in a 3GPP network, which may be a public 3GPP network or a local private 3GPP network operative in a shared spectrum according to a system for shared spectrum access.

Initially, the UE may operate the 3GPP radio transceiver for communication in the public 3GPP network (step 506 of FIG. 5A). The UE may be located such that it is out-of-range or out-of-coverage of a private local non-3GPP wireless network and a private local 3GPP network. Communication in the public 3GPP network may include voice communication and data communication. In preferred implementations, the 3GPP radio transceiver is operated for communication in the public 3GPP network (i.e. for voice and data) without performing regular scanning for discovery of the local private 3GPP network operative in the shared spectrum according to the system for shared spectrum access. In other preferred implementations, the 3GPP radio transceiver is operated for communication in the public 3GPP network (i.e. for voice and data) while performing regular or intermittent scanning for discovery of the local private 3GPP network, but at relatively lengthy time intervals. See e.g. FIG. 2A where UE 202 operates for communication 250 in public 3GPP network 210 via 3GPP base station 214.

While operating the 3GPP radio transceiver for communication in the public 3GPP network, the UE may perform one or more scan operations using the non-3GPP radio transceiver. The UE may be relocated so that it is now in-range or in-coverage of a private local non-3GPP wireless network. Here, the UE may receive, via the non-3GPP radio transceiver in a scan operation, from a non-3GPP access point of the local private non-3GPP wireless network, one or more messages including one or more information elements (step 508 of FIG. 5A). See e.g. FIG. 2B, where UE 202 operates in coverage area 224 of the local private non-3GPP wireless network 220 (as well as coverage area 234 of the local private 3GPP network 230) and receives communication 252 via AP 222 of the local private non-3GPP wireless network 220.

One or more of these information elements in step 508 of FIG. 5A may include one or more identifiers which identify one or more non-3GPP wireless networks with which to connect for communication. In some implementations, the one or more identifiers may be one or more Set Service Identifiers (SSIDs) which identify one or more IEEE 802.11 compliant WLANs. Here, the UE may compare each received SSID with prestored SSIDs stored in a SSID list of the UE and, upon identifying a matching SSID, identify a non-3GPP wireless network with which to connect for communication. Here, the UE may participate in procedures for authentication and association with a non-3GPP wireless network which is a local private non-3GPP wireless network. See again e.g. FIG. 2B where UE 202 operates for communication 250 in public 3GPP network 210 via base station 214 and for communication 252 in local private non-3GPP wireless network 220.

One or more of these information elements in step 508 of FIG. 5A may further indicate presence of the local private 3GPP network. Based on identifying that one or more of the information elements indicate presence of the local private 3GPP network, the UE may operate the 3GPP radio transceiver to scan, discover, or otherwise identify the local private 3GPP network. The UE may transmit from the 3GPP radio transceiver a registration message to a 3GPP base station of the local private 3GPP network for registration in the local private 3GPP network (step 510 of FIG. 5A). Thus, in some implementations, an identification of the one or more information elements that indicate the presence of the local private 3GPP network triggers UE scanning or identification of the local private 3GPP network for registration. See e.g. FIG. 2C, where UE 202 operates to scan, discover, or otherwise identify and register with local private 3GPP network 230 via base station 232 in communication 254.

The UE may then operate the 3GPP radio transceiver for communication in the local private 3GPP network. In some implementations, the UE may control operation of the 3GPP radio transceiver in the local private 3GPP network for both voice and data communication. In preferred implementations, the UE may control operation of the 3GPP radio transceiver for voice communication in the public 3GPP network and for data communication in the local private 3GPP network. See e.g. FIG. 2D, where UE 202 controls operation of its 3GPP radio transceiver for a voice communication 256 in the public 3GPP network 210 and for data communication 254 in the local private 3GPP network 230.

In some implementations, the one or more messages including one or more information elements indicating presence of the local private 3GPP network may be transmitted in response to receiving, from the UE at the non-3GPP access point, a message including a UE indicator indicating UE capability to operate in the local private 3GPP network (e.g. using an active scan operation as previously described). In other implementations, the one or more messages including one or more information elements indicating presence of the local private 3GPP network may be (regularly) broadcasted in a beacon message which includes an OI or an RCOI indicating presence of the local private 3GPP network.

In some implementations, one or more information elements which may indicate presence of the local private 3GPP network may include one or more of an indicator indicating the presence of the local private 3GPP network, a PLMN ID which identifies the local private 3GPP network, a frequency channel for use in the local private 3GPP network, and a cell identifier associated with the local private 3GPP network. Here, the scanning, discovery, and/or identification may be performed based on or according to the one or more information elements (e.g. the PLMN ID, the frequency channel, and/or the cell identifier). In CBRS/LTE, the frequency channel may be an EARFCN and the cell identifier may be a PCI.

Figure 5B:
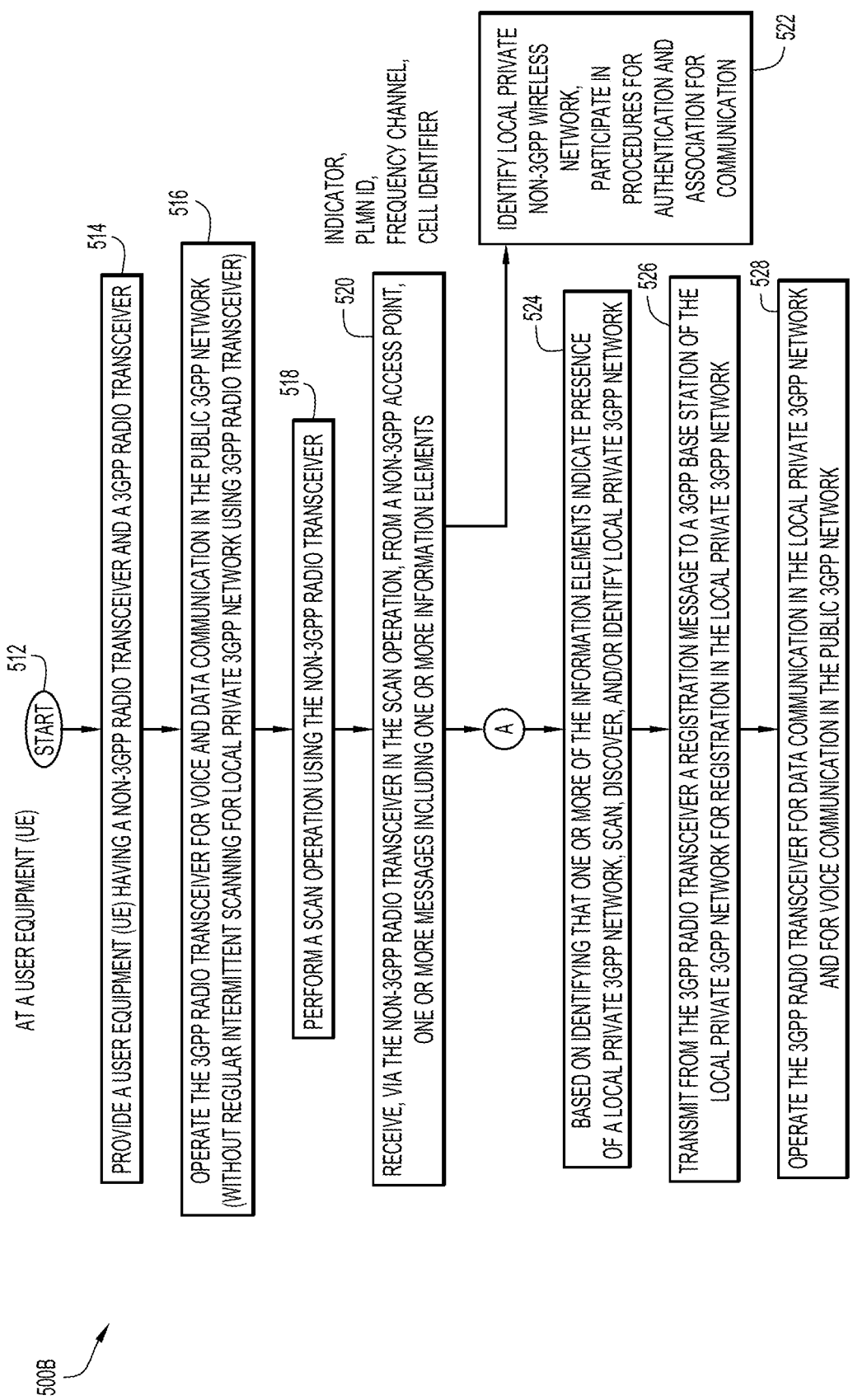
FIGS. 5B and 5C form a flowchart for describing a method of operating a UE having a non-3GPP radio transceiver and a 3GPP radio transceiver, which may be for use in more expediently establishing communication between the UE and a local private 3GPP network and/or reducing power consumption of the UE, according to some implementations of the present disclosure.

FIG. 5B is a flowchart 500B for describing a method of operating a UE having a non-3GPP radio transceiver and a 3GPP radio transceiver. The method of FIG. 5B may be considered to be a more detailed method than the method of FIG. 5A. The non-3GPP radio transceiver may be operative for communication in a local private non-3GPP wireless network. The 3GPP radio transceiver may be operative for communication in a 3GPP network, where the 3GPP network may be a public 3GPP network or a local private 3GPP network operative in a shared spectrum according to a system for shared spectrum access. The UE may operate the 3GPP radio transceiver according to DSDS (e.g. having a dual attach capability). The method may be for use in more expediently establishing communication between a UE and a local private 3GPP network, and/or reducing power consumption of the UE. The method may be performed by a UE or one or more processors of the UE which control operation of the non-3GPP radio transceiver and the 3GPP radio transceiver. The method may be embodied as a computer program product which includes a computer readable medium having computer instructions stored therein which are executed by the one or more processors of the UE.

Beginning at a start block 512 of FIG. 5B, a UE is provided with a non-3GPP radio transceiver and a 3GPP radio transceiver (step 514 of FIG. 5B). The non-3GPP radio transceiver may be operative for communication in a local private non-3GPP wireless network. The 3GPP radio transceiver may be operative for communication in a 3GPP network, which may be public 3GPP network or a local private 3GPP network operative in a shared spectrum according to a system for shared spectrum access.

Initially, the UE may operate the 3GPP radio transceiver for communication in the public 3GPP network (step 516 of FIG. 5B). Communication in the public 3GPP network may include voice communication and data communication. In preferred implementations, the 3GPP radio transceiver is operated for communication in the public 3GPP network (i.e. for voice and data), without performing regular or intermittent scanning for discovery of the local private 3GPP network operative in the shared spectrum according to the system for shared spectrum access. In other preferred implementations, the 3GPP radio transceiver is operated for communication in the public 3GPP network (i.e. for voice and data) while performing regular or intermittent scanning for discovery of the local private 3GPP network, but at relatively lengthy time intervals. See e.g. FIG. 2A where UE 202 operates for communication 250 in public 3GPP network 210 via 3GPP base station 214.

During operation of the 3GPP radio transceiver in the public 3GPP network, the UE may perform one or more scan operations using the non-3GPP radio transceiver (step 518 of FIG. 5B). In some implementations, the scan operation may be a passive scan operation, which may include (regular or periodic) monitoring or receiving from a non-3GPP access point a beacon message which includes beacon message information. In some implementations, the scan operation may be an active scan operation, which may include transmitting to a non-3GPP access point a probe request message and, in response, receiving from the non-3GPP access point a probe response message. In the probe request message, the UE may provide a UE indicator indicating UE capability to operate in the local private 3GPP network.

In the scan operation, the UE may receive, via the non-3GPP radio transceiver, from a non-3GPP access point, one or more messages including one or more information elements (step 520 of FIG. 5B). One or more of these information elements may include one or more identifiers which identify one or more non-3GPP wireless networks with which to connect for communication. In some implementations, the one or more identifiers may be one or more SSIDs which identify one or more IEEE 802.11 compliant WLANs. Here, the UE may compare each received SSID with prestored SSIDs stored in a SSID list of the UE and, upon identifying a matching SSID, identify a non-3GPP wireless network with which to connect for communication (step 522 of FIG. 5B). Here, the UE may participate in procedures for authentication and association with a non-3GPP wireless network which is a local private non-3GPP wireless network. See e.g. FIG. 2B, where UE 202 operates in coverage area 224 of the local private non-3GPP wireless network 220 (as well as coverage area 234 of the local private 3GPP network 230) and receives communication 252 via AP 222 of the local private non-3GPP wireless network 220.

One or more of the information elements of step 520 may further indicate presence of a local private 3GPP network. In some implementations, one or more information elements which may indicate presence of the local private 3GPP network may include one or more of an indicator indicating the presence of the local private 3GPP network, a PLMN ID which identifies the local private 3GPP network, a frequency channel for use in the local private 3GPP network, and a cell identifier associated with the local private 3GPP network. In CBRS/LTE, the frequency channel may be an EARFCN and the cell identifier may be a PCI. The UE may store this information in its memory. See again e.g. FIG. 2B, where UE 202 operates in coverage area 224 of the local private non-3GPP wireless network 220 (as well as coverage area 234 of the local private 3GPP network 230) and receives communication 252 via AP 222 of the local private non-3GPP wireless network 220.

In some implementations, the UE may perform an active scan operation, sending to the non-3GPP access point a probe request message which provides a UE indicator indicating UE capability to operate in the local private 3GPP network. In response, the UE may receive from the non-3GPP access point a probe response message including the one or more information elements indicating presence of the local private 3GPP network. In some implementations, the UE may perform a passive scan operation, receiving from the non-3GPP access point a beacon message which includes an OI or an RCOI indicating presence of the local private 3GPP network.

After performing actions associated with a connector "A" (to be described later in relation to FIG. 5C), based on identifying that one or more of the information elements indicate presence of the local private 3GPP network, the UE may operate the 3GPP radio transceiver to scan, discover, or otherwise identify the local private 3GPP network (step 524 of FIG. 5B). Thus, in some implementations, the identification of the one or more information elements indicating the presence of the local private 3GPP network triggers UE scanning or identification of the local private 3GPP network for registration. The scanning, discovery, and/or identification may be performed based on or according to the one or more information elements (e.g. the PLMN ID, the frequency channel, and/or the cell identifier). The UE may transmit from the 3GPP radio transceiver a registration message to a 3GPP base station of the local private 3GPP network for registration in the local private 3GPP network (step 526 of FIG. 5B). See e.g. FIG. 2C, where UE 202 operates to scan, discover, or otherwise identify and register with local private 3GPP network 230 via base station 232 in communication 254.

The UE may then operate the 3GPP radio transceiver for communication in the local private 3GPP network (step 528 of FIG. 5B). In some implementations, the 3GPP radio transceiver may be controlled to operate in the local private 3GPP network for voice and data communication. In preferred implementations, the 3GPP radio transceiver may be controlled to operate in the public 3GPP network for voice communication and in the local private 3GPP network for data communication. See e.g. FIG. 2D, where UE 202 controls operation of its 3GPP radio transceiver for a voice communication 256 in the public 3GPP network 210 and for data communication 254 in the local private 3GPP network 230.

In some cases, the UE may receive one or more identifiers (e.g. SSIDs) which identify one or more non-3GPP wireless networks in step 520 and connect with one of the non-3GPP wireless networks in step 522, but then fail to receive one or more of information elements indicating presence of a local private 3GPP network. In these cases, the UE may refrain from scanning, discovering, and/or connecting in the local private 3GPP network in steps 524, 526, and 528 of FIG. 5B. In other cases, the UE may receive one or more identifiers (e.g. SSIDs) which identify one or more non-3GPP wireless networks in step 520 and connect with one of the non-3GPP wireless networks in step 522, and then further receive one or more of information elements indicating presence of a local private 3GPP network. In these cases, if the information elements include a PLMN ID of the local private 3GPP network, the UE may compare the received PLMN ID with a prestored PLMN ID. Based upon matching PLMN IDs, the UE may proceed to connect in the local private 3GPP network in steps 524, 526, and 528 of FIG. 5B, but otherwise refrain from performing these steps for connecting.

Figure 5C:
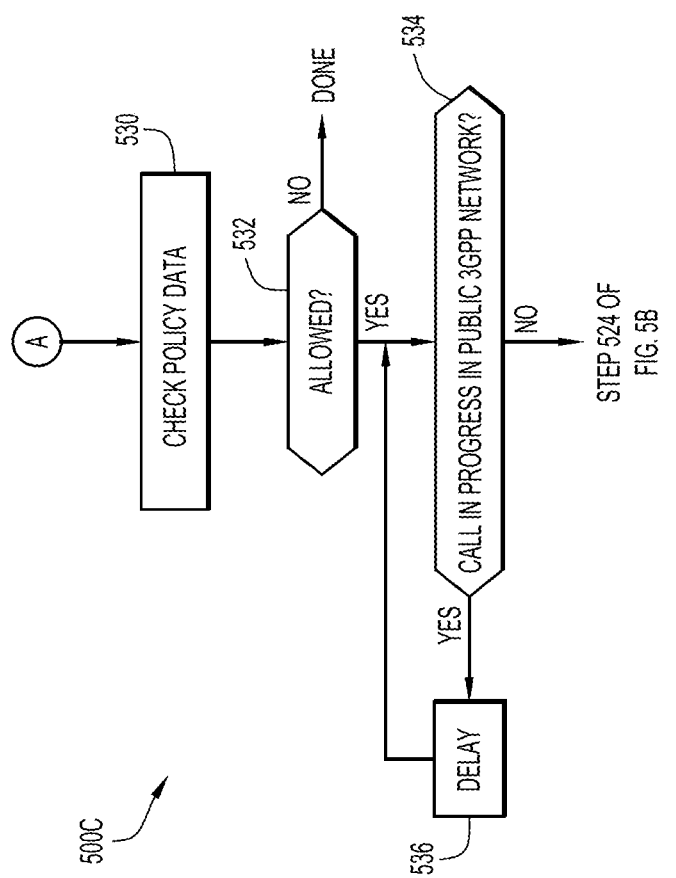

FIG. 5C is a flowchart 500C for describing a part of a method of operating a UE having a non-3GPP radio transceiver and a 3GPP radio transceiver, which may be used in the method of FIG. 5B described earlier above. From connector "A," the UE may check policy data which are stored in memory (step 530 of FIG. 5C). If the policy data indicate that connection with the local private 3GPP network is not allowed (as checked at step 532 of FIG. 5C), then the UE may refrain from connecting with the local private 3GPP network ("Done" at "No" branch of step 532). If the policy data indicate that connection with the local private 3GPP network is allowed (as checked at step 532 of FIG. 5C), then the UE may proceed forward to connect with the local private 3GPP network ("Yes" branch of step 532), by first identifying whether a call is being maintained in the public 3GPP network (as checked at step 534 of FIG. 5C). If a call is being maintained in the public 3GPP network (e.g. call in progress), then the UE may delay the procedures to connect with the local private 3GPP network until completion of the call (step 536 of FIG. 5C). Accordingly, upon completion of the call, the UE may perform the procedures to connect with the local private 3GPP network by continuing to step 524 of FIG. 5B (scanning, discovering, and/or identifying at step 524 of FIG. 5B, followed by the transmitting of the registration message for registration at step 526 of FIG. 5B).

In some implementations of step 532 of FIG. 5C, the policy data may indicate whether the UE should connect with the local private 3GPP network in an automatic fashion or in a manual fashion. If the automatic fashion is indicated, then the UE may proceed forward to automatically connect with the local private 3GPP network. Otherwise, if the manual fashion is indicated, the UE may provide a user interface prompt for receiving a user input for connection to the local private 3GPP network in the manual fashion. Here, if the received user input associated with the user interface prompt corresponds to "CONNECT," then the UE may proceed forward to connect with the local private 3GPP network; otherwise, if the received user input associated with the user interface prompt corresponds to "IGNORE," the UE may refrain from connecting with the local private 3GPP network.

Figure 5D:
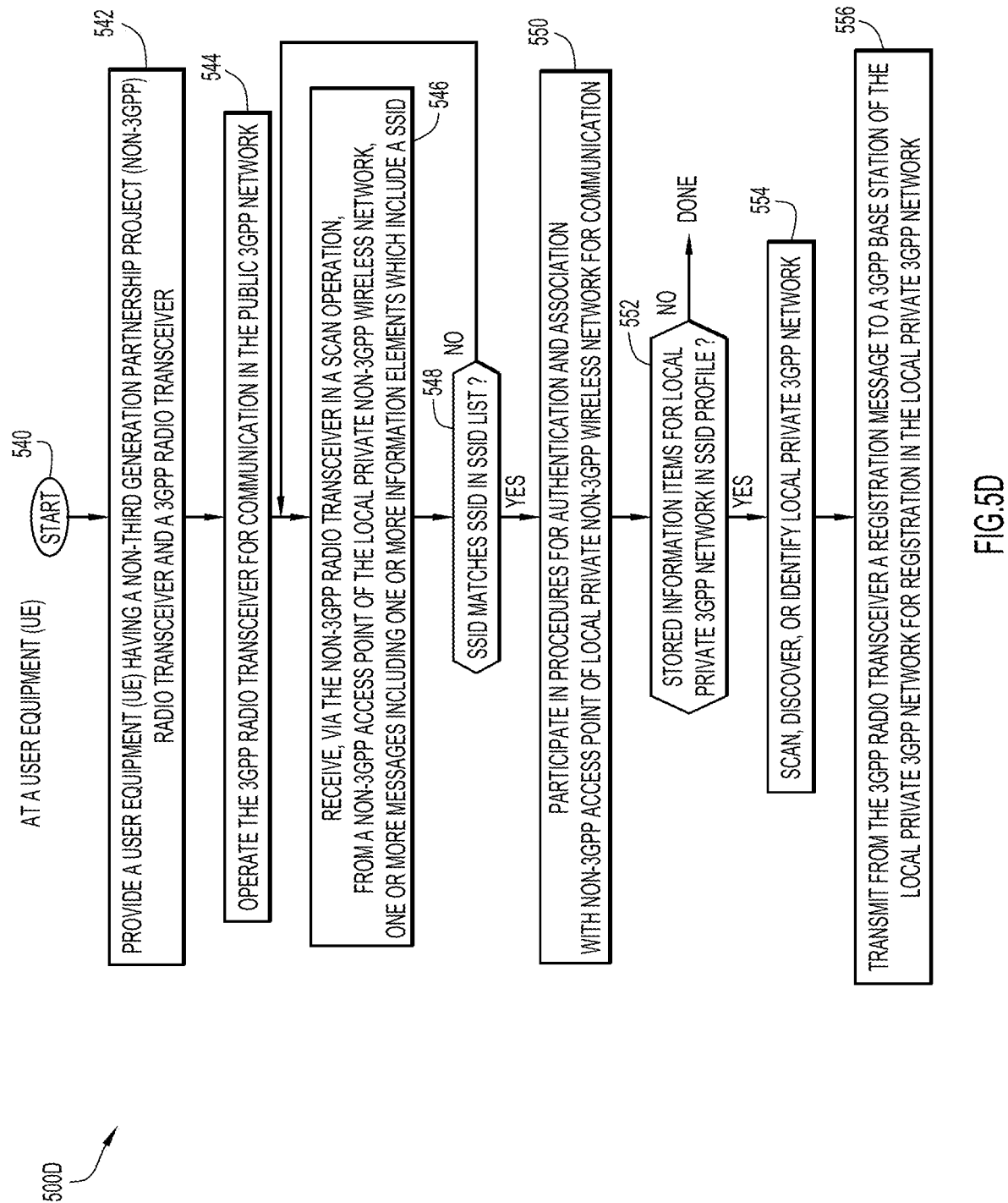
FIG. 5D is a flowchart for describing a method of operating a UE having a non-3GPP radio transceiver and a 3GPP radio transceiver, which may be for use in more expediently establishing communication between the UE and a local private 3GPP network and/or reducing power consumption of the UE, according to some implementations of the present disclosure.

FIG. 5D is a flowchart 500D for describing a method of operating a UE having a non-3GPP radio transceiver and a 3GPP radio transceiver. The non-3GPP radio transceiver may be operative for communication in a local private non-3GPP wireless network. The 3GPP radio transceiver may be operative for communication in a 3GPP network, which may be a public 3GPP network (e.g. licensed band) or a local private 3GPP network operative in a shared spectrum according to a system for shared spectrum access. The method may be for use in more expediently establishing communication between a UE and a local private 3GPP network, and/or reducing power consumption of the UE. The method may be performed by a UE or one or more processors of the UE which control operation of the non-3GPP radio transceiver and the 3GPP radio transceiver. The method may be embodied as a computer program product which includes a computer readable medium having computer instructions stored therein which are executed by the one or more processors of the UE. In some implementations, the UE may perform the method of FIG. 5D each (and every) time after the first time the UE performs the method of FIG. 5A or FIG. 5B-5C.

Beginning at a start block 540 of FIG. 5D, a UE is provided with a non-3GPP radio transceiver and a 3GPP radio transceiver (step 542 of FIG. 5D). The non-3GPP radio transceiver may be operative for communication in a local private non-3GPP wireless network. The 3GPP radio transceiver may be operative for communication in a 3GPP network, which may be public 3GPP network or a local private 3GPP network operative in a shared spectrum according to a system for shared spectrum access.

Initially, the UE may operate the 3GPP radio transceiver for communication in the public 3GPP network (step 544 of FIG. 5D). Communication in the public 3GPP network may include voice communication and data communication. In preferred implementations, the 3GPP radio transceiver is operated for communication in the public 3GPP network (i.e. for voice and data), without performing regular or intermittent scanning for discovery of the local private 3GPP network operative in the shared spectrum. In other preferred implementations, the 3GPP radio transceiver is operated for communication in the public 3GPP network (i.e. for voice and data) while performing regular or intermittent scanning for discovery of the local private 3GPP network, but at relatively lengthy time intervals.

During operation of the 3GPP radio transceiver in the public 3GPP network, the UE may perform one or more scan operations using the non-3GPP radio transceiver. In some implementations, the scan operation using the non-3GPP radio transceiver may be a passive scan operation, which may include (regular or periodic) monitoring of or receiving from a non-3GPP access point a beacon message or frame which includes beacon message information. In some implementations, the scan operation using the non-3GPP radio transceiver may be an active scan operation, which may include transmitting to a non-3GPP access point a probe request message (e.g. using a specific SSID) and, in response, receiving from the non-3GPP access point a probe response message.

In the scan operation, the UE may receive, via the non-3GPP radio transceiver from a non-3GPP access point, one or more messages including one or more information elements (step 546 of FIG. 5D). One or more of these information elements may include one or more identifiers which identify one or more non-3GPP wireless networks with which to connect for communication. In some implementations, the one or more identifiers may be one or more SSIDs which identify one or more IEEE 802.11 compliant WLANs. The UE may compare each received SSID with prestored SSIDs stored in a SSID list of the UE and, upon identifying a matching SSID, identify a non-3GPP wireless network with which to connect for communication (step 548 of FIG. 5D). Here, the UE may participate in procedures for authentication and association with the non-3GPP access point of the local private non-3GPP wireless network (step 550 of FIG. 5D). If no matching SSID is identified in step 548, the UE may continue to perform scan operations using the non-3GPP radio transceiver.

Note that each SSID in the SSID list of SSIDs may be associated with a wireless network profile of a non-3GPP wireless network. At least one of these wireless network profiles may correspond to the local private non-3GPP wireless network which is part of a communication system including a local private 3GPP network. In some implementations, a wireless network profile corresponding to the local private non-3GPP wireless network may include one or more information items associated with the local private 3GPP network. The one or more information items may include one or more of an indicator indicating the presence of the local private 3GPP network, a PLMN ID which identifies the local private 3GPP network, a frequency channel for use in the local private 3GPP network, and a cell identifier associated with the local private 3GPP network. Thus, the UE may store and/or maintain one or more information items corresponding to the local private 3GPP network in a wireless network profile associated with the SSID of the local private non-3GPP wireless network.

In some implementations, one or more information items associated with the local private 3GPP network may be stored in the wireless network profile in response to an initial successful identification and/or connection to the local private 3GPP network (e.g. at any one of steps 520, 522, 524, 526, or 528 of FIG. 5B). This storing of information items may be performed automatically by the UE, with or without manual user confirmation via a user input prompt. In other implementations, one or more information items associated with the local private 3GPP network may be stored in the wireless network profile in a manual fashion via a user input prompt, where the user input prompt is provided in response to the UE connecting to the local private 3GPP network while operating in the local private non-3GPP wireless network.

Accordingly, the UE may identify whether stored information items associated with a local private 3GPP network exist in the wireless network profile associated with the SSID of the local private non-3GPP wireless network (step 552 of FIG. 5D). If no stored information items associated with the local private 3GPP network exist in the wireless network profile, processing in the flowchart of FIG. 5D ends (at "No" branch of step 552 of FIG. 5D). If the UE identifies stored information items associated with a local private 3GPP network in the wireless network profile, then the UE may operate the 3GPP radio transceiver to scan, discover, or otherwise identify the local private 3GPP network (step 554 of FIG. 5D). Thus, in some implementations, the identification of the one or more information items indicating the presence of the local private 3GPP network triggers UE scanning or identification of the local private 3GPP network for registration. The scanning, discovery, and/or identification may be performed based on or according to the one or more information items (e.g. the PLMN ID, the frequency channel, and/or the cell identifier) in the wireless network profile. The UE may transmit from the 3GPP radio transceiver a registration message to a 3GPP base station of the local private 3GPP network for registration in the local private 3GPP network (step 556 of FIG. 5D). The UE may then operate the 3GPP radio transceiver for communication in the local private 3GPP network (e.g. voice and data; or data).

Figure 6:
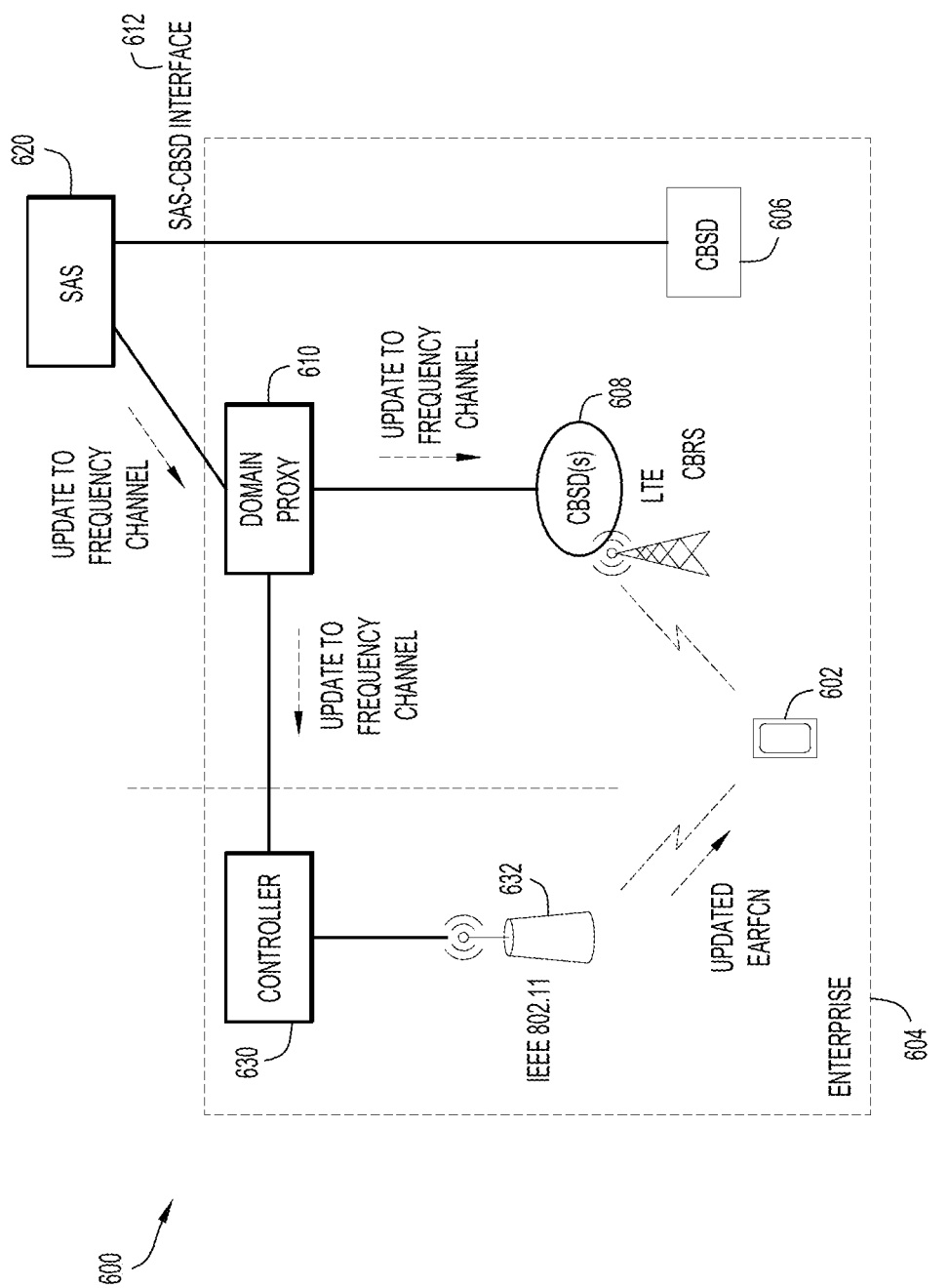
FIG. 6 is an illustrative representation of a communication system of an enterprise, showing a communication of one or more updated parameters for assisted discovery of a local private 3GPP network responsive to an update to spectrum allocation (e.g. an updated frequency channel) according to the system for shared spectrum access.

FIG. 6 is an illustrative representation 600 of selected components of a communication system 604 of an enterprise, for use in describing a technique for providing one or more updated information elements indicating presence of the local private 3GPP network, responsive to receiving updated operating parameters from the system for shared spectrum access. In FIG. 6, the communication system 604 includes a local private WLAN and a local private CBRS LTE network. The local private WLAN is shown to include a controller 630 (e.g. a wireless LAN controller or "WLC") and one or more APs such as an AP 632. The local private CBRS LTE network is shown to include one or more CBSDs (e.g. one or more base stations or CBRS base stations), such as a CBSD 606 or CBSDs 608.

The local private CBRS LTE network may operate in shared spectrum according to a SAS 620. For example, CBSD 606 may communicate in a message exchange for receiving from SAS 620 a grant for spectrum access to spectrum according to a plurality of operating parameters, and further communicate in a message exchange with SAS 620 in a heartbeat procedure for receiving an authorization to use the granted spectrum. In some implementations, message exchanges between CBSD 606 and SAS 620 may be performed directly between CBSD 606 and SAS 620 over a SAS-CBSD interface 612. In other implementations, the message exchanges may be performed between a domain proxy 610 of CBSDs 608 (e.g. most or all CBSDs or base stations in the local private CBRS LTE network) and SAS 620. Here, domain proxy 610 may perform and process the message exchanges on behalf of each one of CBSDs 608.

Accordingly, domain proxy 610 may be involved in the receipt of updated operating parameters of CBSDs 608. For example, domain proxy 610 may be involved in the receipt of an updated frequency channel or EARFCN for a given base station. Controller 630 may receive the updated frequency channel or EARFCN (and/or other parameters) from domain proxy 610 upon receipt. In turn, controller 630 may control operation of AP 632 such that it transmits the updated frequency channel in the one or more messages including the one or more information elements indicating presence of the local private 3GPP network.

Thus, the communication system may operate to communicate one or more updated parameters for assisted discovery of the local private 3GPP network, responsive to an update to the spectrum allocation (e.g. a frequency channel) according to the system for shared spectrum access. When the one or more information elements indicating presence of the local private 3GPP network includes a frequency channel for use in the local private 3GPP network, controller 630 may receive an updated frequency channel and send it to AP 632. AP 632 may transmit one or more messages including one or more updated information elements indicating presence of the local private 3GPP network, where the one or more updated information elements include the updated frequency channel for use in the local private 3GPP network. The updated frequency channel may be received by UE 602, which may use it for expediently identifying and registering with the local private 3GPP network via CBSD 608, as described above in relation to the previous techniques.

Figure 7:
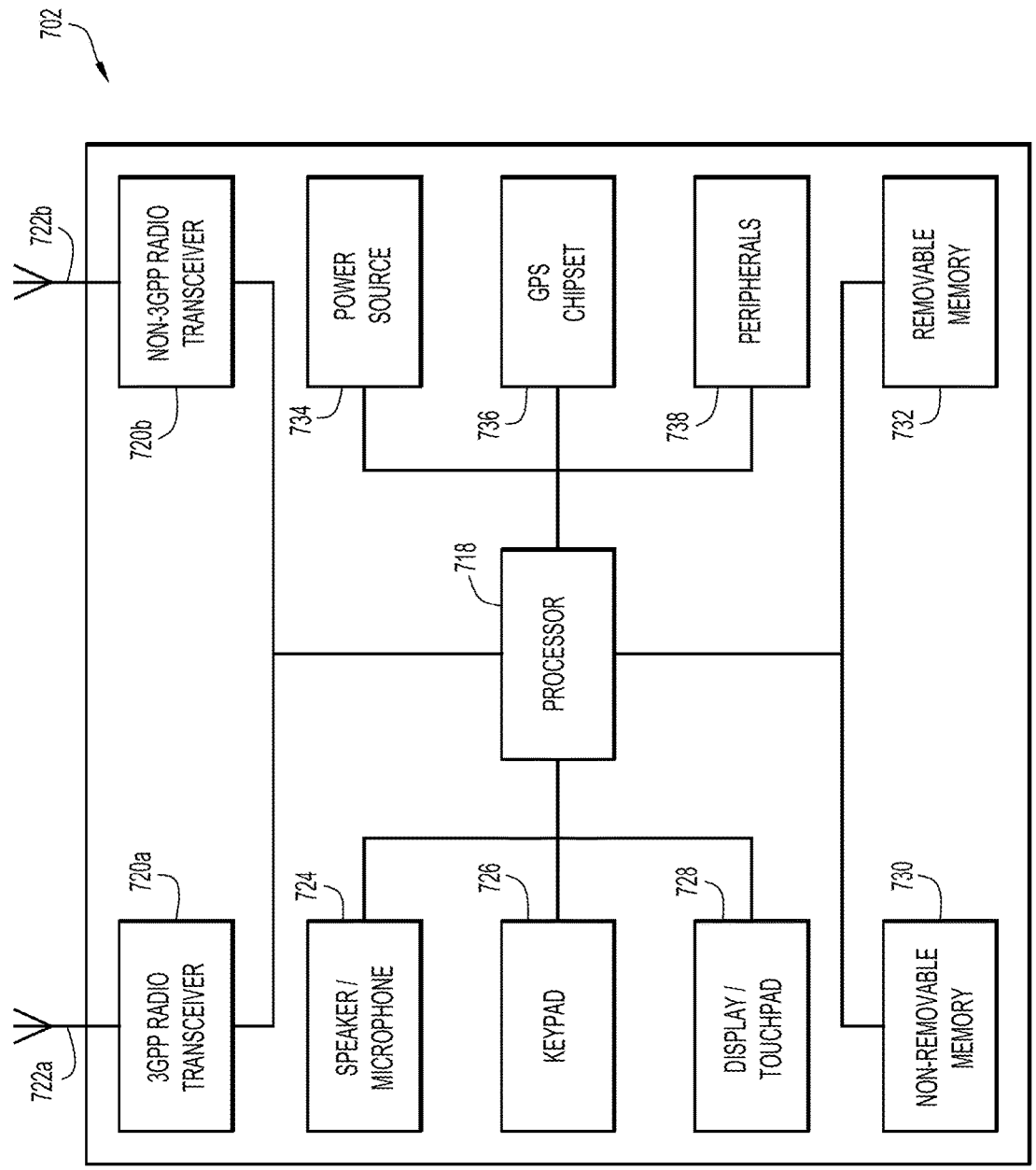
FIG. 7 is an example schematic block diagram of a UE according to some implementations.

Reference is now made to FIG. 7, which shows an example schematic block diagram of a UE 702 according to some implementations. UE 702 may be, for example, a cellular telephone, a smart phone, a tablet, a laptop computer, etc. As shown in FIG. 7, UE 702 may include one or more processors 718, a 3GPP radio transceiver 720a having a transmit/receive element 722a (e.g. CBRS LTE based transceiver), a non-3GPP radio transceiver 720b (e.g. IEEE 802.11 STA) having a transmit/receive element 722b, a speaker/microphone 724, a keypad 726, a display/touchpad 728, non-removable memory 730, removable memory 732, a power source 734, a global positioning system (GPS) chipset 736, and other peripherals 738. It will be appreciated that the UE 702 may include any sub-combination of the foregoing elements while remaining consistent with an embodiment.

Processor 718 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 718 may perform signal coding, data processing, power control, input/output processing, and/or any other functionality that enables UE 702 to operate in a wireless environment.

Processor 718 may be coupled to 3GPP radio transceiver 720a, which may be coupled to the transmit/receive element 722a. Processor 718 may also be coupled to non-3GPP radio transceiver 720b, which may be coupled to the transmit/receive element 722b. While FIG. 7 depicts the processor 718 and transceivers 720a and 720b as separate components, it will be appreciated that the processor 718 and transceivers 720a and/or 720b may be integrated together in an electronic package or chip. Transmit/receive element 722a may be configured to transmit signals to, or receive signals from, a base station over an air interface. For example, in one embodiment, transmit/receive element 722a may be an antenna configured to transmit and/or receive RF signals using 3GPP radio transceiver 720a. The 3GPP radio transceiver 720a may be configured to modulate the signals that are to be transmitted by transmit/receive element 722a and to demodulate the signals that are received by transmit/receive element 722a. In preferred implementations, UE 702 may operate 3GPP radio transceiver 720a according to Dual SIM Dual Standby or DSDS. Transmit/receive element 722b may be configured to transmit signals to, or receive signals from, an access point over an air interface. For example, in one embodiment, transmit/receive element 722b may be an antenna configured to transmit and/or receive RF signals using non-3GPP radio transceiver 720b. The non-3GPP radio transceiver 720b may be configured to modulate the signals that are to be transmitted by transmit/receive element 722b and to demodulate the signals that are received by transmit/receive element 722b.

Processor 718 of UE 702 may be coupled to, and may receive user input data from, speaker/microphone 724, keypad 726, and/or display/touchpad 728 (e.g., a liquid crystal display (LCD) display unit or organic light-emitting diode (OLED) display unit). Processor 718 may also output user data to speaker/microphone 724, keypad 726, and/or display/touchpad 728. In addition, processor 718 may access information from, and store data in, any type of suitable memory, such as non-removable memory 730 and/or removable memory 732. Non-removable memory 730 may include random-access memory (RAM), read-only memory (ROM), a hard disk, or any other type of memory storage device. The removable memory 732 may include a subscriber identity module (SIM) card, a memory stick, a secure digital (SD) memory card, and the like. In other embodiments, processor 718 may access information from, and store data in, memory that is not physically located on UE 702, such as on a server or a home computer (not shown).

Processor 718 may also be coupled to GPS chipset 736, which may be configured to provide location information (e.g., longitude and latitude) regarding the current location of UE 702. In addition to, or in lieu of, the information from the GPS chipset 736, UE 702 may receive location information over an air interface from a base station and/or determine its location based on the timing of the signals being received from two or more nearby base stations.

Processor 718 may further be coupled to other peripherals 738, which may include one or more software and/or hardware modules that provide additional features, functionality and/or wired or wireless connectivity. For example, peripherals 738 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Processor 718 may receive power from power source 734, and may be configured to distribute and/or control the power to the other components in the UE 702. Power source 734 may be any suitable device for powering UE 702. For example, power source 734 may include one or more dry cell batteries, solar cells, fuel cells, and the like.

Figure 8:
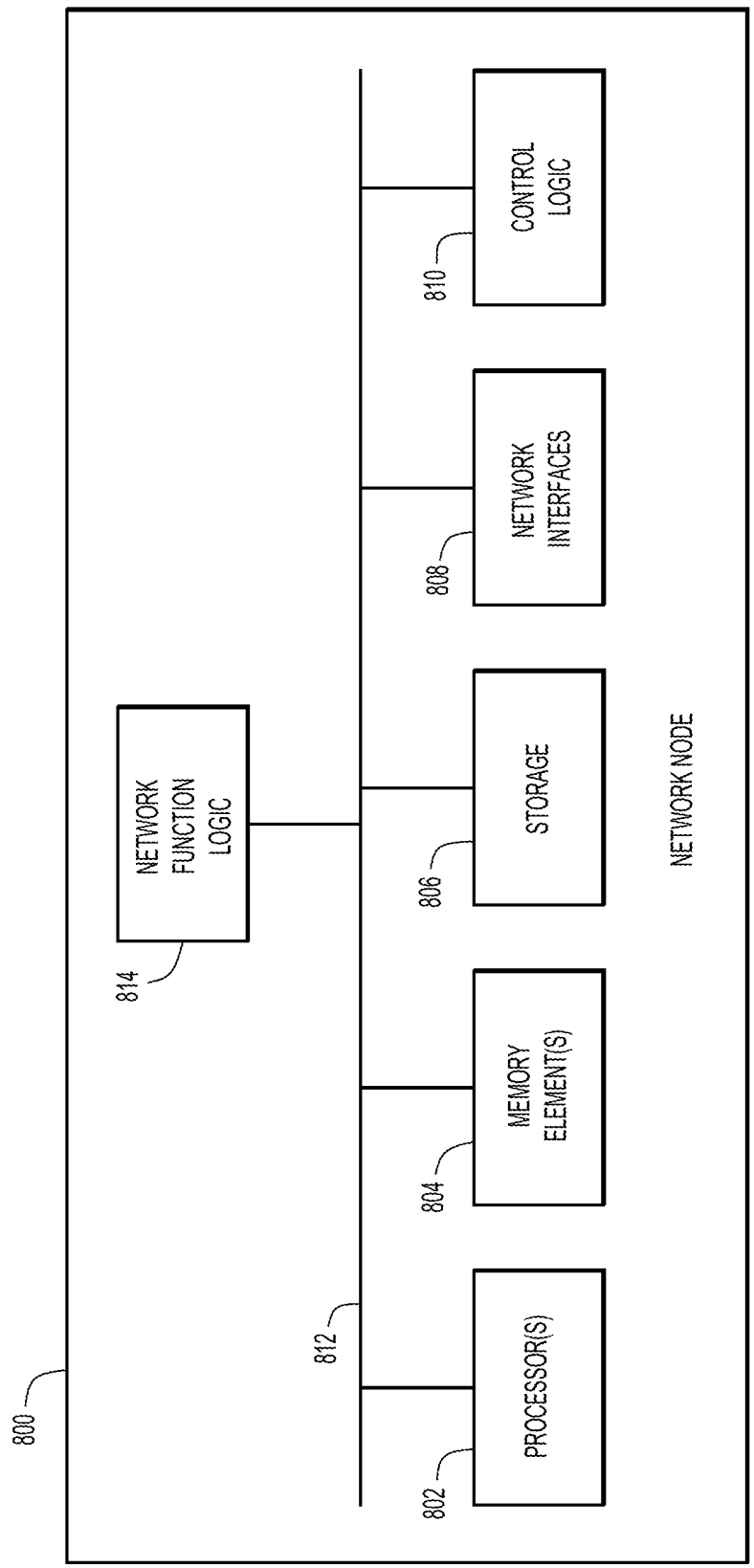
FIG. 8 is a simplified block diagram of a network node which may be or include a controller or network function operative according to some implementations.

FIG. 8 is a simplified block diagram of a network node 800 which may be a controller or network function operative according to some implementations. Such network node 800 may be used as a controller or network function in a communication system, network, controller, access point, or base station, according to the techniques described earlier above. In some implementations, network node 800 may include one or more processors 802, one or more memory elements 804, storage 806, network interfaces 808, control logic 810 and network function logic 814. In some implementations, the processor 802 may be or include at least one hardware processor configured to execute various tasks, operations and/or functions for network node 800 as described herein according to software and/or instructions configured for the network node 800. In some implementations, memory element 804 and/or storage 806 are configured to store data, information, software, instructions, logic (e.g. any logic 810 and/or 814), data structures, combinations thereof, or the like for various embodiments described herein. Note that in some implementations, storage may be consolidated with memory element (or vice versa), or may overlap/exist in any other suitable manner.

In some implementations, network interfaces 808 enable communication between for network node 800 and other network elements, systems, slices, etc. that may be present in the system to facilitate operations as discussed for various embodiments described herein. In some implementations, network interfaces 808 may include one or more Ethernet drivers and/or controllers, Fiber Channel drivers, and/or controllers, or other similar network interface drivers and/or controllers to enable communications for network node 800 within the system.

In some implementations, control logic 810 may include instructions that, when executed (e.g. via processor 802), cause for network node 800 to perform operations, which may include, but not be limited to, providing overall control operations of network node 800; cooperating with other logic, data structures, etc. provisioned for and/or maintained by network node 800; combinations thereof; or the like to facilitate various operations as discussed for various embodiments described herein.

In some implementations, bus 812 may be configured as an interface that enables one or more elements of network node 800 (e.g. processor 802, memory element 804, logic, etc.) to communicate in order to exchange information and/or data. In at least one embodiment, bus 812 may be implemented as a fast kernel-hosted interconnect, potentially using shared memory between processes (e.g. logic, etc.), which may enable efficient communication paths between the processes. In some implementations, network function logic 814 may include instructions that, when executed (e.g. via one or more processor 802) cause network node 800 to perform one or more operations for one or more network elements as discussed for various implementations described herein.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

Note that the terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

The terms 'UE', 'mobile device,' 'mobile radio device,' 'end device', 'user', 'subscriber' or variations thereof may be used interchangeably and are inclusive of devices used to communicate, such as a computer, an electronic device such as an Internet of Things (IoT) device (e.g. an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A UE may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in DSP instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory element and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more the elements identified herein could be some type of a programmable processor, programmable digital logic (e.g. a field programmable gate array (FPGA), a DSP processor, an EPROM, a controller, an electrically erasable PROM (EEPROM), or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and may accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first information elements could be termed a second information element, and similarly, a second information element could be termed a first information element, without changing the meaning of the description, so long as all occurrences of the "first information element" are renamed consistently and all occurrences of the "second information element" are renamed consistently. The first information element and the second information element are both information elements, but they are not the same information element.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    in a communication system of an enterprise, including a local private non-Third Generation Partnership Project (non-3GPP) wireless network and a local private 3GPP network operative in a shared spectrum according to a system for shared spectrum access,
        receiving a probe request message from a user equipment (UE) via a non-3GPP access point of the local private non-3GPP wireless network; and
        transmitting a probe response message to the UE from the non-3GPP access point of the local private non-3GPP wireless network, the probe response message having one or more information elements indicating presence of the local private 3GPP network and including operating parameters of a 3GPP base station of the local private 3GPP network that were allocated by the system for shared spectrum access.

2. The method of claim 1, further comprising:
receiving, at the 3GPP base station of the local private 3GPP network, a registration message for registration of the UE in the local private 3GPP network after transmitting the probe response message.

3. The method of claim 1, wherein:
receiving the probe request message comprises receiving the probe request message including a UE indicator indicating UE capability to operate in the local private 3GPP network, and
transmitting the probe response message having the one or more information elements indicating the presence of the local private 3GPP network is performed in response to receiving the probe request message including the UE indicator indicating the UE capability to operate in the local private 3GPP network.

4. The method of claim 1, wherein transmitting the response message further comprises:
    transmitting the probe response message having the one or more information elements indicating the presence of the local private 3GPP network and including the operating parameters which comprise a public land mobile network (PLMN) ID which identifies the local private 3GPP network, a frequency channel of the 3GPP base station of the local private 3GPP network, and a cell identifier of the 3GPP base station of the local private 3GPP network.

5. The method of claim 1, wherein the operating parameters include a frequency channel for use of the 3GPP base station in the local private 3GPP network, the method further comprising:
    receiving, from the system for shared spectrum access, an updated frequency channel of the 3GPP base station of in the local private 3GPP network; and
    transmitting, from the non-3GPP access point of the local private non-3GPP wireless network, one or more messages including the updated frequency channel for use of the 3GPP base station in the local private 3GPP network.

6. The method of claim 1, wherein:
the local private non-3GPP wireless network comprises a local private IEEE 802.11 compliant wireless local area network (WLAN) including the non-3GPP access point which comprises an IEEE 802.11 compliant access point, the local private 3GPP network comprises a local private Long Term Evolution (LTE) network or a local private Fifth Generation (5G) network, and the local private 3GPP network operative in the shared spectrum is further operative in a Citizens Broadband Radio Service (CBRS) spectrum according to a Spectrum Access System (SAS).

7. The method of claim 1, wherein the communication system including the local private non-3GPP wireless network and the local private 3GPP network comprises an integrated communication system having an integrated local private non-3GPP and 3GPP network.

8. A method comprising:
at a user equipment (UE) having a non-Third Generation Partnership Project (non-3GPP) radio transceiver operative for communication in a local private non-3GPP wireless network of an enterprise system and a 3GPP radio transceiver operative for communication a local private 3GPP network of the enterprise system in a shared spectrum according to a system for shared spectrum access,
 operating the 3GPP radio transceiver to register for communication in a public 3GPP network in a licensed spectrum, while being out-of-range for communication in the local private 3GPP network in the shared spectrum;
 operating the non-3GPP radio transceiver in a scan operation, while being registered for communication in the public 3GPP network in the licensed spectrum;
 receiving, via the non-3GPP radio transceiver in the scan operation, from a non-3GPP access point of the local private non-3GPP wireless network, one or more messages having one or more information elements; and
 based on identifying that one or more of the information elements indicate presence of the local private 3GPP network, transmitting from the 3GPP radio transceiver a registration message to a 3GPP base station of the local private 3GPP network to register for communication in the local private 3GPP network in the shared spectrum.

9. The method of claim 8, wherein operating the 3GPP radio transceiver to register for communication in the public 3GPP network in the licensed spectrum comprises operating the 3GPP radio transceiver to enable voice and data communication in the public 3GPP network in the licensed spectrum.

10. The method of claim 9, wherein the UE is configured to operate with Dual Subscriber Identity Module (SIM) Dual Standby (DSDS), the method further comprising:
 after registering with the local private 3GPP network via the 3GPP base station of the local private 3GPP network, operating the 3GPP radio transceiver with use of DSDS to enable data communication in the local private 3GPP network in the shared spectrum and voice communication in the public 3GPP network in the licensed spectrum.

11. The method of claim 8, further comprising:
 associating with the non-3GPP access point of the local private non-3GPP wireless network for communication; and
 storing or maintaining one or more information items corresponding to the local private 3GPP network in a wireless network profile associated with a Set Service Identifier (SSID) of the local private non-3GPP wireless network.

12. The method of claim 8, wherein the scan operation further comprises:
 an active scan operation which includes transmitting to the non-3GPP access point of the local private non-3GPP wireless network, a probe request message and receiving, from the non-3GPP access point of the local private non-3GPP wireless network, a probe response message having the one or more information elements indicating the presence of the local private 3GPP network and including operating parameters of the 3GPP base station of the local private 3GPP network that were allocated by the system for shared spectrum access.

13. The method of claim 8, further comprising:
 transmitting, to the non-3GPP access point of the local private non-3GPP wireless network, a message including a UE indicator indicating UE capability to operate in the local private 3GPP network,
 wherein receiving the one or more messages having the one or more information elements indicating the presence of the local private 3GPP network is in response to transmitting the message including the UE indicator indicating UE capability to operate in the local private 3GPP network.

14. The method of claim 8, wherein receiving the one or more messages having the one or more information elements further comprises receiving one or more messages including one or more of an indicator which indicates the presence of the local private 3GPP network, a public land mobile network (PLMN) ID of the local private 3GPP network, a frequency channel of the 3GPP base station of the local private 3GPP network, and a cell identifier of the 3GPP base station of the local private 3GPP network, the method further comprising:
 discovering or identifying the local private 3GPP network for communication according to one or more of the PLMN ID, the frequency channel, and the cell identifier.

15. The method of claim 8, further comprising:
 based on identifying that the one or more information elements indicate the presence of the local private 3GPP network,
 checking policy data stored in memory of the UE; and
 identifying whether a call is being maintained via the 3GPP radio transceiver in the public 3GPP network,
 wherein transmitting further comprises transmitting the registration message to the 3GPP base station of the local private 3GPP network based on the policy data and after completion of the call in the public 3GPP network.

16. The method of claim 8, wherein the scan operation further comprises:
 a passive scan operation which includes receiving, from the non-3GPP access point of the local non-3GPP wireless network, a beacon message which includes a Roaming Consortium Organization Identifier (RCOI) indicating the presence of the local private 3GPP network.

17. The method of claim 8, wherein:
 the local private non-3GPP wireless network comprises a private IEEE 802.11 compliant wireless local area network (WLAN) including the non-3GPP access point which comprises an IEEE 802.11 compliant access point,
 the local private 3GPP network comprises a local private Long Term Evolution (LTE) network or a local private Fifth Generation (5G) network, the local private 3GPP network operative in the shared spectrum according to the system for shared spectrum access is further operative in a Citizens Broadband Radio Service (CBRS) spectrum according to a Spectrum Access System (SAS), and when the 3GPP radio transceiver operates for communication in the public 3GPP network in the licensed spectrum, the 3GPP radio transceiver is operated without performing regular or intermittent scanning for discovery of the local private 3GPP network in the shared spectrum.

18. A method comprising:

in a communication system of an enterprise, including a local private non-Third Generation Partnership Project (non-3GPP) wireless network and a local private 3GPP network operative in a shared spectrum according to a system for shared spectrum access, broadcasting, via a non-3GPP access point of the local private non-3GPP wireless network, a beacon message which includes a Roaming Consortium Organization Identifier (RCOI) indicating presence of the local private 3GPP network; and receiving, from a user equipment (UE) via a 3GPP base station of the local private 3GPP network, a registration message for registration of the UE in the local private 3GPP network identified by the RCOI.

19. The method of claim 18, further comprising:

transmitting, to the UE via the non-3GPP access point of the local private non-3GPP wireless network, one or more messages including operating parameters of the 3GPP base station of the local private 3GPP network that were allocated by the system for shared spectrum access.

20. The method of claim 19, wherein the operating parameters comprise a public land mobile network (PLMN) ID which identifies the local private 3GPP network, a frequency channel of the 3GPP base station of the local private 3GPP network, and a cell identifier of the 3GPP base station of the local private 3GPP network.

* * * * *

UNITED STATES PATENT AND TRADEMARK OFFICE
CERTIFICATE OF CORRECTION

PATENT NO. : 11,490,263 B2  
APPLICATION NO. : 16/590713  
DATED : November 1, 2022  
INVENTOR(S) : Rajesh S. Pazhyannur et al.

Page 1 of 1

It is certified that error appears in the above-identified patent and that said Letters Patent is hereby corrected as shown below:

In the Claims

Claim 4, Column 20, Lines 39-40, please replace "transmitting the response message" with --transmitting the probe response message--

Claim 8, Column 21, Lines 19-20, please replace "communication a local private" with --communication in a local private--

Signed and Sealed this  
Seventh Day of March, 2023

Katherine Kelly Vidal  
*Director of the United States Patent and Trademark Office*